United States Patent
Osa

(10) Patent No.: US 9,595,113 B2
(45) Date of Patent: Mar. 14, 2017

(54) IMAGE TRANSMISSION SYSTEM, IMAGE PROCESSING APPARATUS, IMAGE STORAGE APPARATUS, AND CONTROL METHODS THEREOF

(71) Applicant: CANON KABUSHIKI KAISHA, Tokyo (JP)

(72) Inventor: Kinya Osa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/729,199

(22) Filed: Jun. 3, 2015

(65) Prior Publication Data

US 2015/0356741 A1 Dec. 10, 2015

(30) Foreign Application Priority Data

Jun. 4, 2014 (JP) ................................. 2014-116200

(51) Int. Cl.
*G06K 9/34* (2006.01)
*G06T 7/00* (2006.01)
(Continued)

(52) U.S. Cl.
CPC .......... *G06T 7/0081* (2013.01); *G06K 9/6215* (2013.01); *G06K 9/6223* (2013.01); *G06T 9/00* (2013.01); *G06T 2207/20141* (2013.01)

(58) Field of Classification Search
CPC ... G06T 3/40; G06T 9/00; G06T 2207/20141; G06T 2207/10028; G06T 2200/04; G06T 2207/10024; G06T 7/0081; G06K 9/6215; G06K 9/00201; G06K 9/00234; G06K 9/6223; H04N 19/517; H04N 19/44
(Continued)

(56) References Cited

U.S. PATENT DOCUMENTS 5,321,520 A * 6/1994 Inga ..................... H04N 1/2179
358/1.9
8,472,718 B2 * 6/2013 Lv ......................... G06T 3/4053
382/173

(Continued)

FOREIGN PATENT DOCUMENTS

| JP | 08-030787 | 2/1996 |
| JP | 09-098295 | 4/1997 |
| JP | 10-004549 | 1/1998 |

OTHER PUBLICATIONS

Achanta, et al.,"SLIC Superpixels", EPFL Technical Report 149300, Jun. 2010, pp. 1-15.

(Continued)

*Primary Examiner* — Kanjibhai Patel
(74) *Attorney, Agent, or Firm* — Carter, DeLuca, Farrell & Schmidt, LLP

(57) ABSTRACT

A transmission device divides image data into a plurality of regions on the basis of a similarity of pixels and transmits the image data and region representative points of the plurality of regions. A reception device receives the image data and the region representative points transmitted from the transmission device. The reception device generates region labels used for identifying the plurality of regions using the image data and the region representative points.

7 Claims, 16 Drawing Sheets

(51) Int. Cl.
*G06K 9/62* (2006.01)
*G06T 9/00* (2006.01)
(58) Field of Classification Search
USPC .................................................. 382/173, 180
See application file for complete search history.

(56) References Cited

U.S. PATENT DOCUMENTS

| | | | | |
|---|---|---|---|---|
| 8,958,630 | B1 * | 2/2015 | Gallup | G06K 9/6293 |
| | | | | 382/159 |
| 9,002,055 | B2 * | 4/2015 | Funayama | G06T 7/0081 |
| | | | | 382/103 |
| 9,111,356 | B2 * | 8/2015 | Yoo | G06T 7/0081 |
| 9,171,108 | B2 * | 10/2015 | Chen | G06F 17/5004 |
| 9,342,754 | B2 * | 5/2016 | Zhou | G06K 9/4652 |

OTHER PUBLICATIONS

Achanta, et al., "SLIC Superpixels Compared to State-of-the-Art Superpixel Methods", Journal of Latex Class Files, vol. 6, No. 1, Dec. 2011, pp. 1-8.
Ren, et al., "gSLIC: a real-time implementation of SLIC superpixel segmentation", Technical Report, Dept. of Engineering Science, University of Oxford, Jun. 28, 2011, pp. 1-6.

* cited by examiner

EXAMPLE OF LABEL MAP

REGION REPRESENTATIVE POINT (SEED) POSITIONS

INITIAL REGION REPRESENTATIVE POINT (SEED) POSITIONS

CLUSTERING OF PIXELS

UPDATE OF REGION REPRESENTATIVE POINT (SEED) POSITIONS

CORRESPONDENCE RELATIONSHIP BETWEEN BLOCKS
AND REGION REPRESENTATIVE POINTS (SEEDS)

CURRENT PIXEL AND NEIGHBORING REGION
REPRESENTATIVE POINTS (SEEDS)

DECISION OF REGION REPRESENTATIVE POINT (SEED)
TO WHICH CURRENT PIXEL BELONGS

EXAMPLE OF LABEL MAP

CENTERS OF GRAVITY IN REGIONS

IMAGE TRANSMISSION SYSTEM, IMAGE PROCESSING APPARATUS, IMAGE STORAGE APPARATUS, AND CONTROL METHODS THEREOF

BACKGROUND OF THE INVENTION

Field of the Invention

The present invention relates to a technique of handing information about an image or a region in an image.

Description of the Related Art

Image region division processing is widely used as preprocessing of object detection, scene analysis, and region-specific image processing (for example, noise reduction processing) because it can grasp the structural feature of an image by putting similar pixels in the image together and dividing the image into regions. Note that the image region division processing is also called segmentation or superpixel division. As a method of image region division, there are proposed various methods such as a method using clustering, mean shift, region growing, split-and-merge, and a graph-based method. In particular, a method using k-means clustering described in patent literature 1 (Japanese Patent Laid-Open No. 8-30787) is suitable for high-speed execution because of a light processing load. To further speed up the method using k-means clustering, SLIC described in non-patent literature 1 (Radhakrishna Achanta, Appu Shaji, Kevin Smith, Aurelien Lucchi, Pascal Fua, and Sabine Susstrunk, "SLIC Superpixels", EPFL Technical Report, 2010) or non-patent literature 2 (Radhakrishna Achanta, Appu Shaji, Kevin Smith, Aurelien Lucchi, Pascal Fua, and Sabine Susstrunk, "SLIC Superpixels Compared to State-of-the-Art Superpixel Methods", IEEE Transactions on Pattern Analysis and Machine Intelligence, vol. 34, num. 11, pp. 2274-2282, 2012) or gSLIC described in non-patent literature 3 (Carl Yuheng Ren and Ian Reid, "gSLIC: a real-time implementation of SLIC superpixel segmentation", Technical report, Dept of Engineering Science, University of Oxford, 2011) is usable.

On the other hand, a label map shown in FIG. 1A is used as a method of expressing a region division processing result. The label map stores a region label (normally, a number) used to identify a region to which a pixel belongs on a pixel basis and needs data storage areas as many as the number of pixels. To reduce the data area to store the label map, a method of JBIG-compressing the label map into a bit plane, as described in patent literature 2 (Japanese Patent Laid-Open No. 9-98295) or a method of compressing the label map by combining reduction and binary image encoding, as described in patent literature 3 (Japanese Patent Laid-Open No. 10-4549) is usable.

In an image transmission system formed from a network camera and a server, when transmitting a result of region division processing executed in the network camera to the server and using it, the problem is what kind of format should be used to transmit the region division processing result. If data is transmitted in the format of the label map shown in FIG. 1A, data transfer as much as the image size is necessary, and a very large transmission band is used. When the label map compression technique described in patent literature 2 or 3 is used, the transmission data amount can be suppressed to a fraction of several tens. However, the transmission band is desired to be further decreased as much as possible.

When performing region division in the camera and performing processing using the result as well, the size of the memory to hold the region division result and the memory transfer band to read out the region division result and use it are problematic. In addition, when storing a region division result together with an image in an apparatus for storing image data, the size of the storage area used for storage similarly poses a problem.

SUMMARY OF THE INVENTION

The present invention has been made in consideration of these problems, and provides a technique that enables image transmission in a smaller information amount.

According to the first aspect of the present invention, there is provided an image transmission system having a transmission device and a reception device, wherein the transmission device comprising: a division unit configured to divide image data into a plurality of regions on the basis of a similarity of pixels; and a transmission unit configured to transmit the image data and region representative points of the plurality of regions, and the reception device comprising: a reception unit configured to receive the image data and the region representative points transmitted from the transmission device; and a label generation unit configured to generate region labels used for identifying the plurality of regions, using the image data and the region representative points.

According to the second aspect of the present invention, there is provided an image processing apparatus comprising: a region division unit configured to divide image data into a plurality of regions on the basis of a similarity of pixels and output region representative points of the divided regions; a data holding unit configured to hold the region representative points; an image data holding unit configured to hold the image data; a label generation unit configured to read out the image data held by the image data holding unit and the region representative points held by the data holding unit and generate region labels used for identifying the plurality of regions; and a region processing unit configured to perform processing using the region labels generated by the label generation unit.

According to the third aspect of the present invention, there is provided an image storage apparatus comprising: a storage unit configured to divide image data into a plurality of regions on the basis of a similarity of pixels and store the image data and region representative points of the divided regions; and a label generation unit configured to read out the image data and the region representative points stored in the storage unit and generate region labels used for identifying the plurality of regions, wherein if one of the region label and processing using the region label is necessary, the image data and the corresponding region representative points are read out from the storage unit, and the region label is generated by the label generation unit and used.

According to the fourth aspect of the present invention, there is provided an image processing apparatus comprising: a medium access unit configured to access a medium that stores image data and region representative points of a plurality of regions into which the image data is divided on the basis of a similarity of pixels; and a label generation unit configured to generate region labels used for identifying the plurality of regions, from the image data and the region representative points read out by the medium access unit, wherein if one of the region label and processing using the region label is necessary, the image data and the corresponding region representative points are read out from the medium access unit, and the region labels are generated by the label generation unit and used.

According to the fifth aspect of the present invention, there is provided a control method of an image transmission system having a transmission device and a reception device, wherein the transmission device divides image data into a plurality of regions on the basis of a similarity of pixels, the transmission device transmit the image data and region representative points of the plurality of regions, the reception device receives the image data and the region representative points transmitted from the transmission device, and the reception device generates region labels used for identifying the plurality of regions using the image data and the region representative points.

According to the sixth aspect of the present invention, there is provided a control method of an image processing apparatus, comprising: a region division step of dividing image data into a plurality of regions on the basis of a similarity of pixels and outputting region representative points of the divided regions; and a label generation step of reading out the image data and the region representative points and generate region labels used for identifying the plurality of regions, wherein a processing is performed using the region labels generated in the label generation step.

According to the seventh aspect of the present invention, there is provided a control method of an image storage apparatus, comprising: a dividing step of dividing image data into a plurality of regions on the basis of a similarity of pixels and storing the image data and region representative points of the divided regions in a storage unit; and a label generation step of reading out the image data and the region representative points stored in the storage unit and generating region labels used for identifying the plurality of regions, wherein if one of the region label and processing using the region label is necessary, the image data and the corresponding region representative points stored in the storage unit are read out, and the region labels are generated in the label generation step and used.

According to the eighth aspect of the present invention, there is provided a control method of an image processing apparatus, comprising: a medium access step of accessing a medium that stores image data and region representative points of a plurality of regions into which the image data is divided on the basis of a similarity of pixels; and a label generation step of generating region labels from the image data and the region representative points read out in the medium access step, wherein if one of the region label and processing using the region label is necessary, the image data and the corresponding region representative points are read out, and the region labels are generated in the label generation step and used.

Further features of the present invention will become apparent from the following description of exemplary embodiments (with reference to the attached drawings).

DESCRIPTION OF THE EMBODIMENTS

Embodiments of the present invention will now be described with reference to the accompanying drawings. Note that the embodiments to be described below are examples of detailed implementation of the present invention or detailed examples of the arrangement described in the appended claims.

First Embodiment

Figure 2:
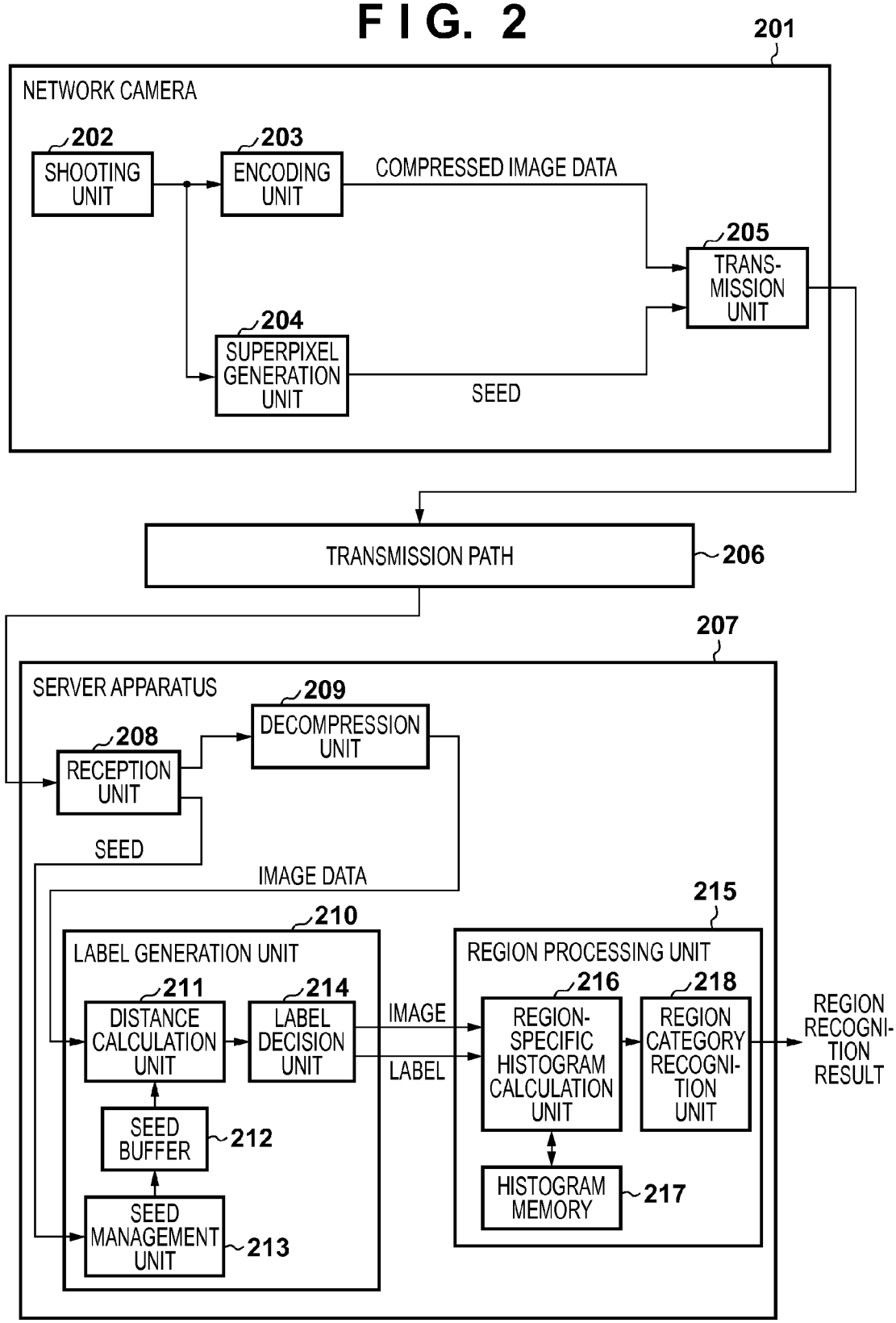
FIG. 2 is a block diagram showing an example of the arrangement of a system.

An example of the arrangement of a system (image transmission system) according to this embodiment will be described first with reference to the block diagram of FIG. 2. As shown in FIG. 2, the system according to this embodiment includes a network camera 201 serving as a transmission device and a server apparatus 207 serving as a reception device. The network camera 201 and the server apparatus 207 are connected via a transmission path 206 such as a LAN or the Internet.

The network camera 201 will be described first.

A shooting unit 202 captures a moving image or still image of a physical space, and sends a captured image (each frame image when the image is a moving image, or a still image itself when the image is a still image) to an encoding unit 203 and a Superpixel generation unit 204 of the subsequent stage.

The encoding unit 203 performs encoding processing for the image sent from the shooting unit 202 to generate an encoded image, and sends the encoded image to a transmission unit 205 of the subsequent stage. Note that the encoding method employed by the encoding unit 203 is not limited to a specific encoding method. Note that the encoding processing is not essential, and the encoding unit 203 may directly output the image sent from the shooting unit 202 without encoding.

The Superpixel generation unit 204 performs Superpixel generation processing (region division processing) for the image sent from the shooting unit 202 to divide the image into a plurality of regions, generates information (seed data) that associates a region with the representative point (seed) of the region on a region basis, and sends it to the transmission unit 205 of the subsequent stage.

The transmission unit 205 transmits the encoded image sent from the encoding unit 203 and the seed data of each region sent from the Superpixel generation unit 204 to the server apparatus 207 via the transmission path 206.

The server apparatus 207 will be described next.

A reception unit 208 receives the encoded image and the seed data of each region transmitted from the network camera 201 via the transmission path 206, and sends the encoded image to a decompression unit 209 and the seed data of each region to a label generation unit 210.

The decompression unit 209 decompresses the encoded image to generate a decompressed image and send the decompressed image to the label generation unit 210 of the subsequent stage. If the captured image has not undergone the encoding processing on the side of the network camera 201, not an encoded image but the captured image itself is transmitted from the network camera 201. In this case, the decompression unit 209 directly sends the captured image to the label generation unit 210 of the subsequent stage as a decompressed image, as a matter of course.

The label generation unit 210 performs labeling processing for the decompressed image sent from the decompression unit 209 using the seed data received from the reception unit 208, and sends the decompressed image and the result of labeling processing to a region processing unit 215 of the subsequent stage.

The region processing unit 215 recognizes the category (for example, person, mountain, or the like) of the region of each label in the decompressed image using the decompressed image and the labeling processing result sent from the label generation unit 210, and outputs the result.

The label generation unit 210 will be described here in more detail.

A seed management unit 213 stores, in a seed buffer 212, the seed data of each region sent from the reception unit 208.

For each pixel of the decompressed image sent from the decompression unit 209, a distance calculation unit 211 calculates the distance between the pixel and the seed corresponding to the seed data stored in the seed buffer 212.

A label decision unit 214 specifies a seed corresponding to a pixel for each pixel of the decompressed image based on the calculation result of the distance calculation unit 211, and outputs a label corresponding to the seed in association with the pixel.

The region processing unit 215 will be described next in more detail.

Using the decompressed image and the label sent from the label decision unit 214, a region-specific histogram calculation unit 216 creates, for each label, the histogram (histogram of pixel values) of a pixel group corresponding to the label while using a histogram memory 217. Every time a histogram is created, the region-specific histogram calculation unit 216 sends the histogram to a region category recognition unit 218 of the subsequent stage.

The region category recognition unit 218 discriminates the category of each region using the histogram of the region sent from the region-specific histogram calculation unit 216. As a method of category discrimination, various methods such as a rule-based method, a method using a neural network, and a method using a discriminator such as SVM are applicable.

Figure 4:
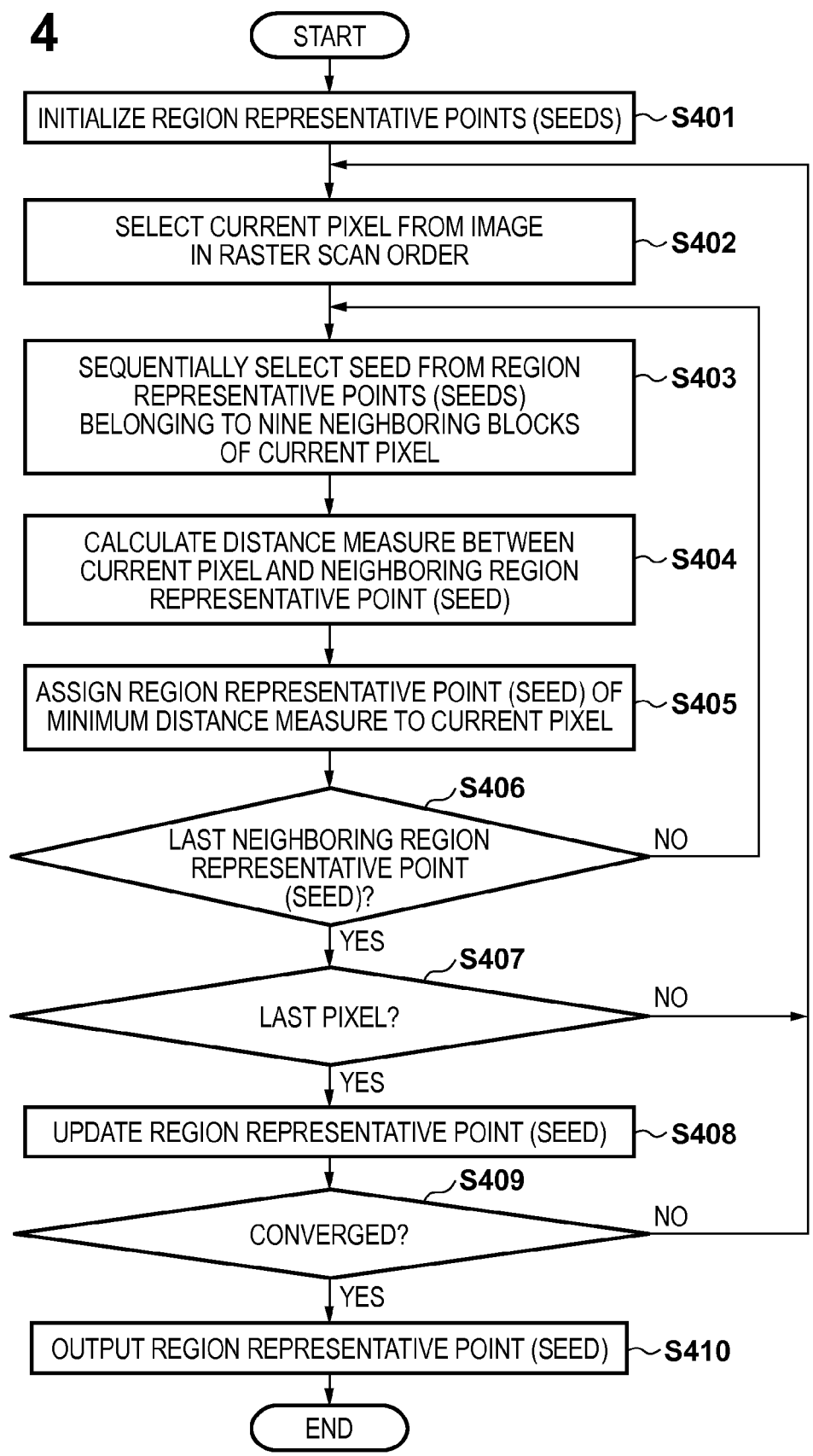
FIG. 4 is a flowchart of processing performed by the Superpixel generation unit 204.

Processing performed by the Superpixel generation unit 204 will be described next with reference to FIG. 4 showing the flowchart of the processing. Note that the Superpixel generation unit 204 generates a five-dimensional vector given by $$p_i = (l_i, a_i, b_i, x_i, y_i) \quad (1)$$

for each pixel of the captured image before the start of processing according to the flowchart of FIG. 4.

$p_i$ in equation (1) represents a vector corresponding to an ith (i=1, . . . , M: M is the total number of pixels of the captured image) pixel (pixel i) in the captured image. This vector includes, as elements, the coordinate position (xi, yi) of the pixel i and pixel values li, ai, and bi at the coordinate position (xi, yi) in the CIELAB color space.

Hence, when generating the vector pi, the Superpixel generation unit 204 sets the x-coordinate value and the y-coordinate value of the pixel i to (xi, yi), respectively, and sets the L value, a value, and b value at the coordinate position (xi, yi) to the pixel values li, ai, and bi, respectively.

<Step S401>

Figure 3A:
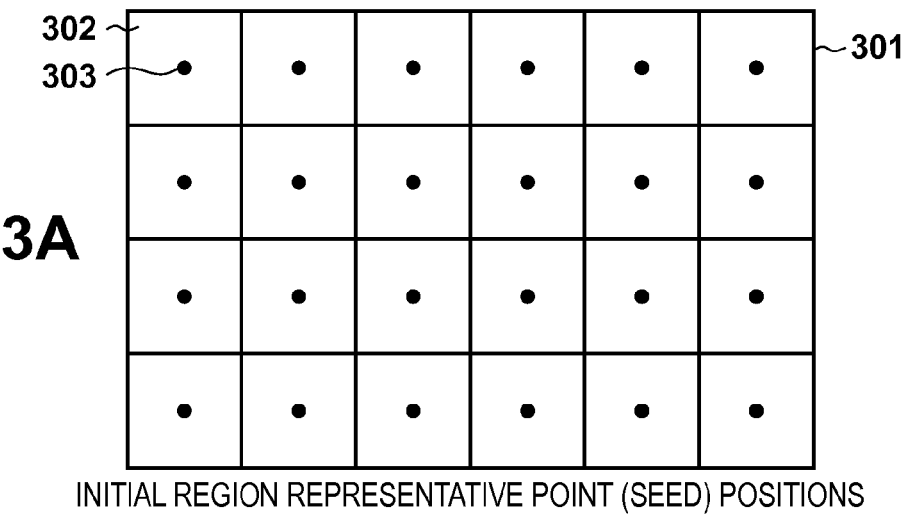
FIGS. 3A to 3C are views for explaining processing performed by a Superpixel generation unit 204.

First, an image (to be referred to as a captured image hereinafter) sent from the shooting unit 202 is divided into a plurality of rectangular regions, and one representative point, that is, a seed is set in each rectangular region. For example, as shown in FIG. 3A, a captured image 301 is divided into 4×6=a total of 24 rectangular regions 302, and one seed 303 is set in each rectangular region 302.

A vector Cj corresponding to a seed (seed j) set in a jth (j=N: N is the number of rectangular regions, and N=24 in FIG. 3A) rectangular region (rectangular region j) in the captured image is initialized. The vector Cj is a five-dimensional vector given by, for example, $$C_j = (l_j, a_j, b_j, x_j, y_j) \quad (2)$$

More specifically, the vector Cj includes, as elements, the coordinate position (xj, yj) of the seed j in the captured image and pixel values lj, aj, and bj at the coordinate position (xj, yj) in the CIELAB color space. Hence, when initializing the vector Cj, the x-coordinate value and the y-coordinate value of the seed j are set to (xj, yj), respectively, and the L value, a value, and b value at the coordinate position (xj, yj) are set to the pixel values li, ai, and bi, respectively. Such initialization of the vector Cj is performed for j=1 to N, thereby initializing the vector corresponding to each seed. The vector of each seed is assigned information representing a rectangular region to which the seed belongs. For example, in FIG. 3A, a vector C1 of the seed in the rectangular region at the upper left corner is assigned identification information (for example, region ID=1) of the rectangular region at the upper left corner.

Note that a description has been made here using the CIELAB color space in accordance with non-patent literatures 1, 2, and 3. However, another color space such as an RGB color space or a YCC color space may be used as the color space used for Superpixel generation.

In this step, the variable i to be used in the following processing is initialized to 1.

<Step S402>

The ith pixel is selected from the captured image as a selected pixel (pixel i). The order of selecting the pixels from the captured image is not limited to a specific selection order. However, the pixels may be selected in the raster scan order, as indicated by, for example, a dotted line 304 in FIG. 3B.

<Step S403>

Figure 3B:
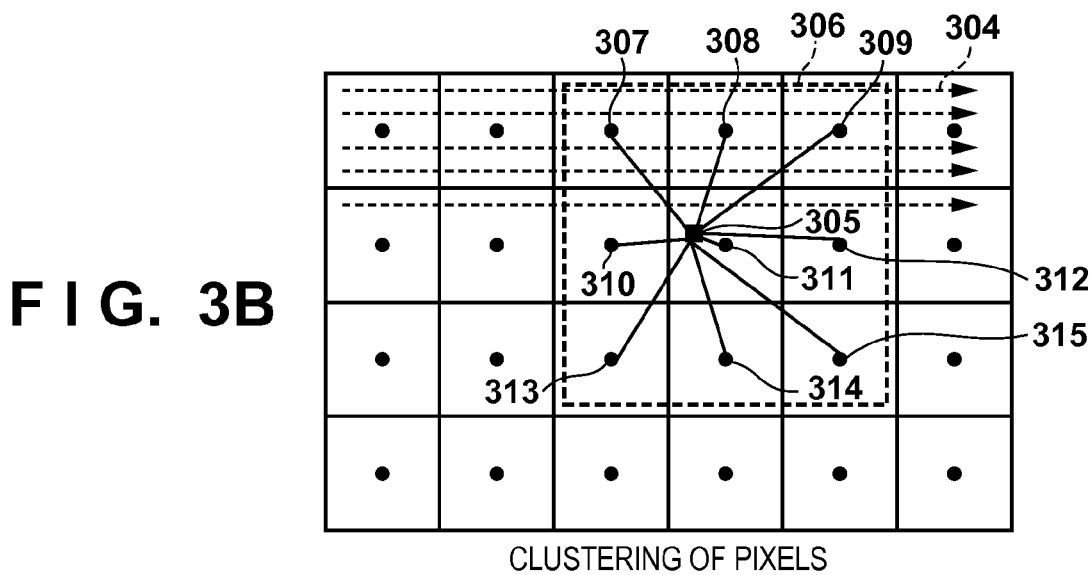

A rectangular region to which the pixel i belongs is specified out of the rectangular regions generated in step S401, and eight rectangular regions adjacent to the specified rectangular region are specified. An unselected seed is selected out of seeds (candidate representative points) corresponding to the nine specified rectangular regions. In FIG. 3B, seeds in 3×3 rectangular regions (rectangular region group surrounded by a thick broken line 306) formed from the rectangular region including a selected pixel 305 and eight rectangular regions adjacent to the rectangular region are indicated by full circles 307 to 315, and an unselected seed is selected out of the seeds.

<Step S404>

Using the vector pi of the pixel i selected in step S402 and the vector of the seed selected in step S403, equations (3) to (6) are calculated (in equations (3) to (6), the vector of the seed selected in step S403 is represented by Cj).

$$d_c = \sqrt{(l_i - l_j)^2 + (a_i - a_j)^2 + (b_i - b_j)^2} \quad (3)$$

$$d_s = \sqrt{(x_i - x_j)^2 + (y_i - y_j)^2} \quad (4)$$

$$D = \sqrt{d_c^2 + \left(\frac{d_s}{S}\right)^2 m^2} \quad (5)$$

$$S = \sqrt{\frac{N}{K}} \quad (6)$$

With this calculation, a distance measure D in a feature space between the pixel i and the seed selected in step S403 is calculated. The distance measure D can be calculated by equation (5) using a Euclidean distance dc on the color space given by equation (3) and a Euclidean distance ds on the coordinate space given by equation (4). A grid interval S is decided by equation (6) using the number N of pixels and the number K of regions, and m is a parameter to weight dc and ds. Note that although the distance measure D described in non-patent literature 2 has been described here, the formula of the distance measure is not limited to this equation, and the calculation may be done using another formula.

<Step S405>

If the distance measure D obtained this time in step S404 is minimum out of the distance measures D obtained so far for the pixel i, the seed selected in step S403 is assigned to the pixel i.

<Step S406>

It is determined whether all seeds corresponding to the rectangular region including the pixel i and the eight rectangular regions adjacent to the rectangular region are selected. Upon determining that all seeds are selected, the process advances to step S407. If an unselected seed remains, the process returns to step S403.

<Step S407>

It is determined whether all pixels of the captured image are selected as the selected pixel. That is, it is determined whether the value of the variable i reaches M. Upon determining that all pixels are selected, the process advances to step S408. If an unselected pixel remains, the value of the variable i is incremented by one, and the process returns to step S402.

<Step S408>

When the process advances to step S408, each pixel of the captured image is assigned any one of the seeds. Hence, in this step, an average coordinate position is obtained for each seed using the coordinate position of each pixel in the vector assigned the seed, and the coordinate position of the seed in the vector is updated by the average coordinate position. Additionally, in this step, an average pixel value is obtained for each seed using the pixel value of each pixel in the vector assigned the seed, and the pixel value of the seed in the vector is updated by the average pixel value (for each of l, a, and b).

Figure 3C:
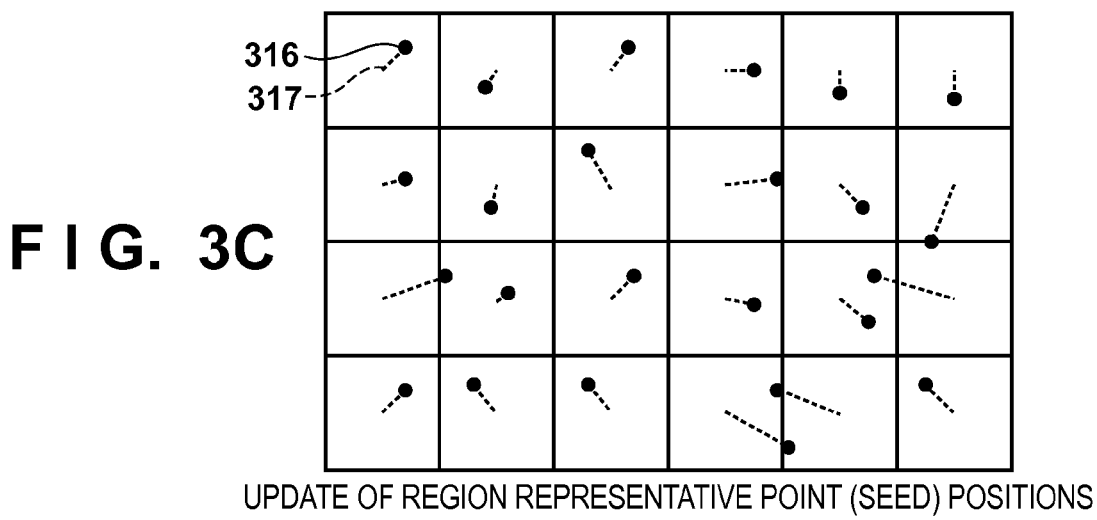

With this processing, the coordinate position of each seed is updated, as shown in FIG. 3C. In some cases, the seed moves out of the rectangular region to which it originally belongs. However, in gSLIC described in non-patent literature 3, the correspondence relationship between each seed and a block to which the seed belongs is fixed, and the correspondence relationship of nine seeds that are associated with each other as shown in FIG. 3B when the coordinate position of the selected pixel is given is predetermined.

In this embodiment, the vector of each seed is associated with the rectangular region to which the seed originally belongs. Hence, the association with the rectangular region to which the seed originally belongs remains unchanged regardless of the manner the position of the seed changes. In FIG. 3C, a dotted line is drawn between each seed and a rectangular region to which the seed originally belongs.

<Step S409>

It is determined whether a convergence condition is met, for example, whether the change amount of the coordinate position of each seed in step S408 is a predetermined amount or less, whether the distortion value of clustering is a predetermined value or less, or whether the processes of steps S402 to S408 are executed a predetermined number of times or more. Upon determining that the convergence condition is met, the process advances to step S410. If the convergence condition is not met, the value of the variable i is initialized to 1, and the process returns to step S402.

<Step S410>

Seed data including the vector of a seed and the identification information of a rectangular region to which the seed belongs is generated for each seed, and the generated seed data is sent to the transmission unit 205 of the subsequent stage.

Figure 6:
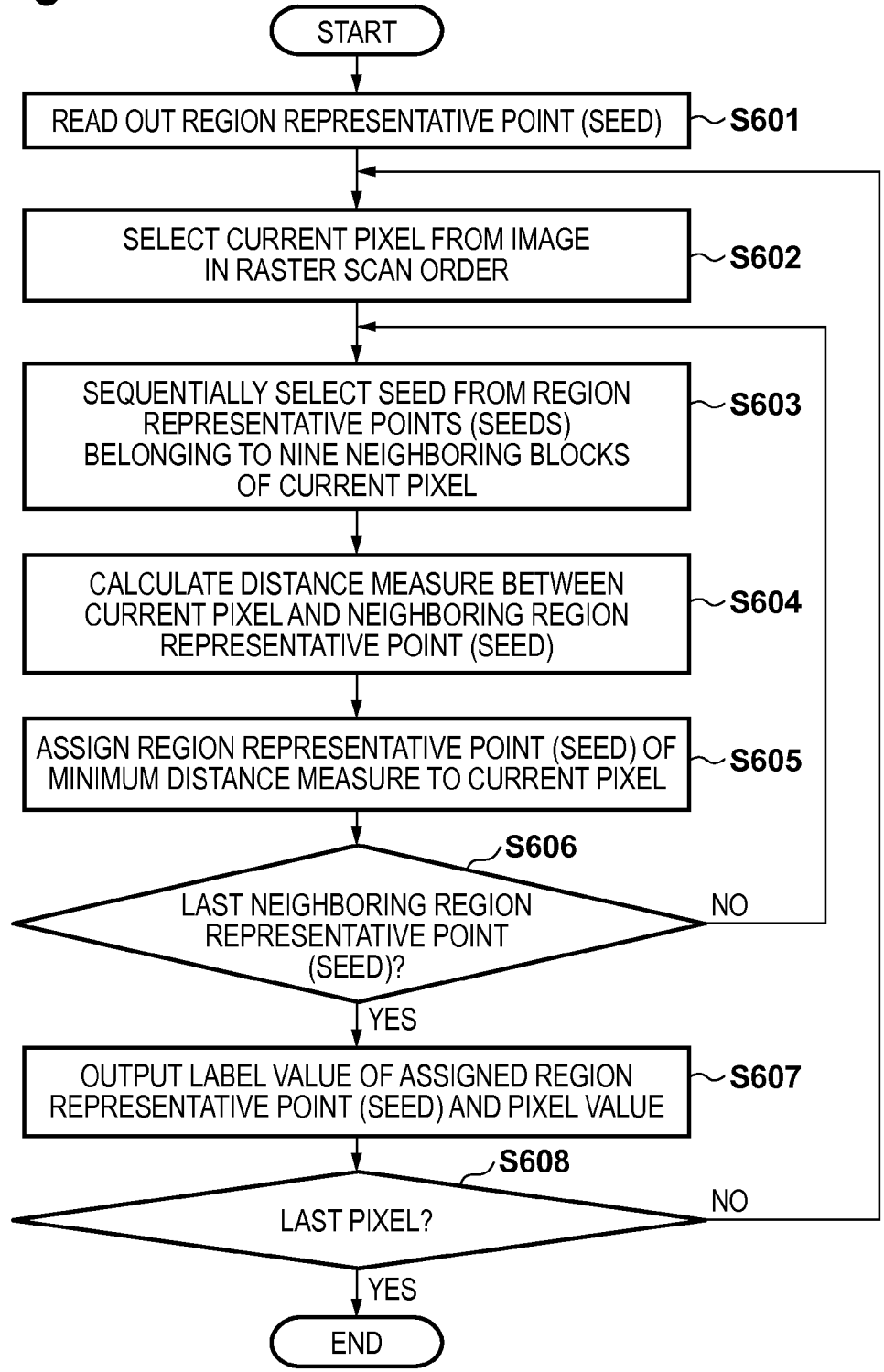
FIG. 6 is a flowchart of processing performed by the label generation unit 210.

Processing performed by the label generation unit 210 will be described next with reference to FIG. 6 showing the flowchart of the processing. Note that the label generation unit 210 generates the above-described vector pi for each pixel of the decompressed image sent from the decompression unit 209 before the start of processing according to the flowchart of FIG. 6.

<Step S601>

Figure 5A:
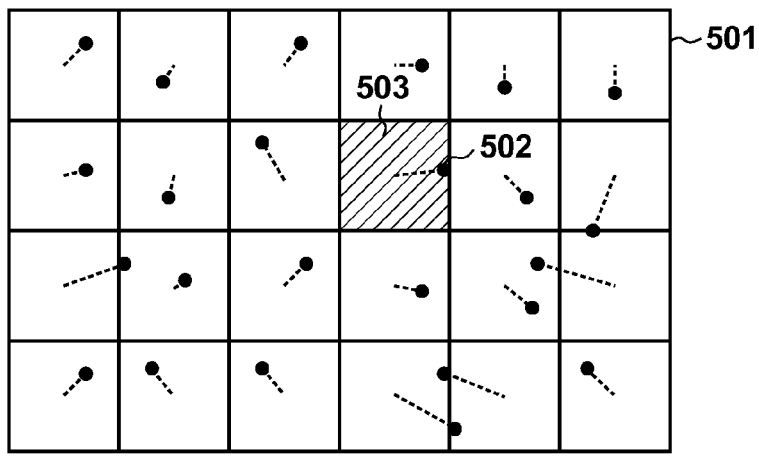
FIGS. 5A to 5C are views for explaining processing performed by a label generation unit 210.

The seed management unit 213 stores seed data received by the reception unit 208 in the seed buffer 212. Note that the transfer unit of seed data from the network camera 201 to the server apparatus 207 and the storage unit to the seed buffer 212 are not limited to specific units. That is, the seed data of an entire image may be received from the network camera 201 and stored in the seed buffer 212. Alternatively, the seed data as much as the unit of the capacity of the seed buffer 212 may be received from the network camera 201 and stored in the seed buffer 212. A case where seed data generated for one captured image on the side of the network camera 201 is acquired at once and stored in the seed buffer 212 will be described below. For example, assume that seed data of a seed 502 for each of 4×6 rectangular regions 503 in a captured image 501 is stored in the seed buffer 212, as shown in FIG. 5A. As described above, a seed is not necessarily located in a corresponding rectangular region, as in some lower right rectangular regions.

In this step, the distance calculation unit 211 initializes the value of the variable i to be used in the following processing to 1.

<Step S602>

The distance calculation unit 211 selects the ith pixel from the decompressed image sent from the decompression unit 209 as a selected pixel (pixel i). The order of selecting the pixels from the decompressed image is not limited to a specific selection order. However, the pixels may be selected in the raster scan order, as indicated by, for example, dotted lines in FIG. 5B.

<Step S603>

The distance calculation unit 211 first divides the decompressed image into a plurality of rectangular regions. This division processing is the same as the division of step S401 described above. Note that as for the rectangular regions on the captured image and the rectangular regions on the decompressed image, rectangular regions at the same position are assigned the same identification information. However, the same identification information need not always be used as long as rectangular regions at the same position on one image and the other image can be specified.

Figure 5B:
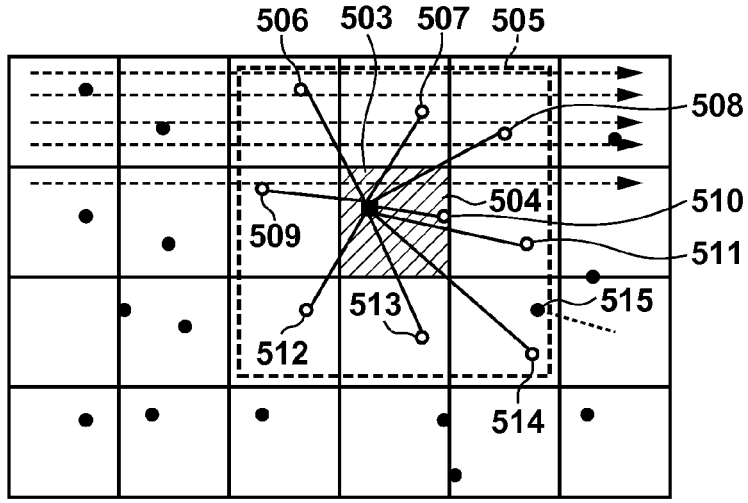

The distance calculation unit 211 specifies, out of the rectangular regions, a rectangular region to which the pixel i belongs and eight rectangular regions adjacent to the specified rectangular region. The distance calculation unit 211 acquires, from the seed buffer 212, unselected seed data out of seed data including the identification information of the nine specified rectangular regions. In FIG. 5B, seeds in 3×3 rectangular regions (rectangular region group surrounded by a thick broken line 505) formed from the rectangular region including a selected pixel 504 and eight rectangular regions adjacent to the rectangular region are indicated by open circles 506 to 514, and seed data of an unselected seed is acquired.

Note that although a seed indicated by a full circle 515 is located in a region included in the above-described nine rectangular regions, the seed data of this seed is not selected because it is a seed moved from a rectangular region other than the nine rectangular regions.

<Step S604>

The distance calculation unit 211 calculates equations (3) to (6) described above using the vector pi of the pixel i and the vector in the seed data selected in step S603 (in equations (3) to (6), the vector in the seed data selected in step S603 is represented by Cj). With this calculation, the distance measure D between the pixel i and the seed corresponding to the seed data selected in step S603 is calculated. Note that although the distance measure D described in non-patent literature 2 has been described here, the formula of the distance measure is not limited to this equation, and the calculation may be done using another formula.

<Step S605>

Figure 5C:
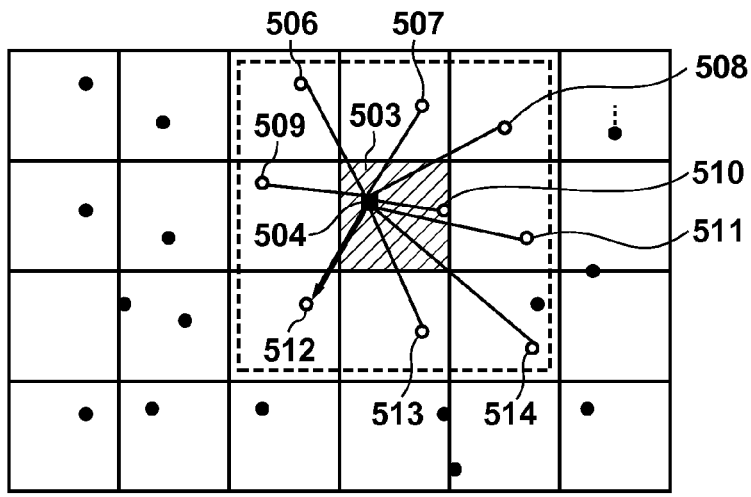

If the distance measure D obtained this time in step S604 is minimum out of the distance measures D obtained so far for the pixel i, the label decision unit 214 assigns the seed data selected in step S603 to the pixel i (FIG. 5C).

<Step S606>

The distance calculation unit 211 determines whether all seed data including the identification information of the rectangular region including the pixel i and the eight rectangular regions adjacent to the rectangular region are selected. Upon determining that all seed data are selected, the process advances to step S607. If unselected seed data remains, the process returns to step S603.

<Step S607>

The label decision unit 214 outputs the decompressed image and a label value corresponding to the seed data assigned to the pixel i.

<Step S608>

The distance calculation unit 211 determines whether all pixels of the captured image are selected as the selected pixel. That is, the distance calculation unit 211 determines whether the value of the variable i reaches M. Upon determining that all pixels are selected, the processing according to the flowchart of FIG. 6 ends. If an unselected pixel remains, the value of the variable i is incremented by one, and the process returns to step S602.

Figure 1A:
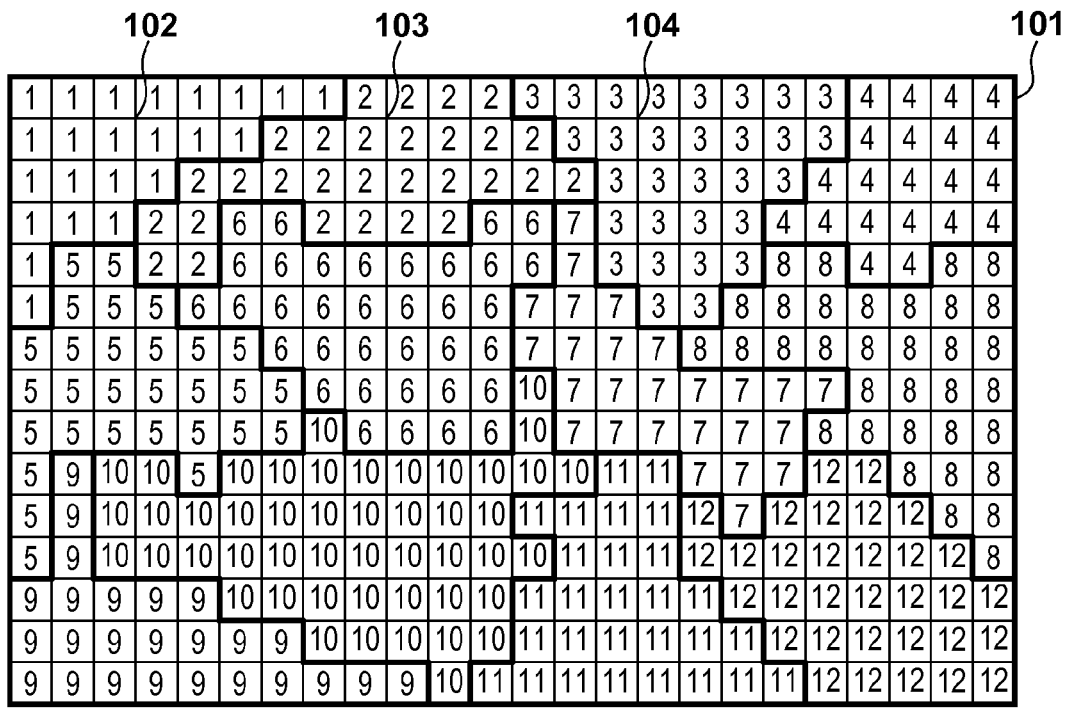
FIGS. 1A and 1B are views showing a label map and seeds.
Figure 1B:
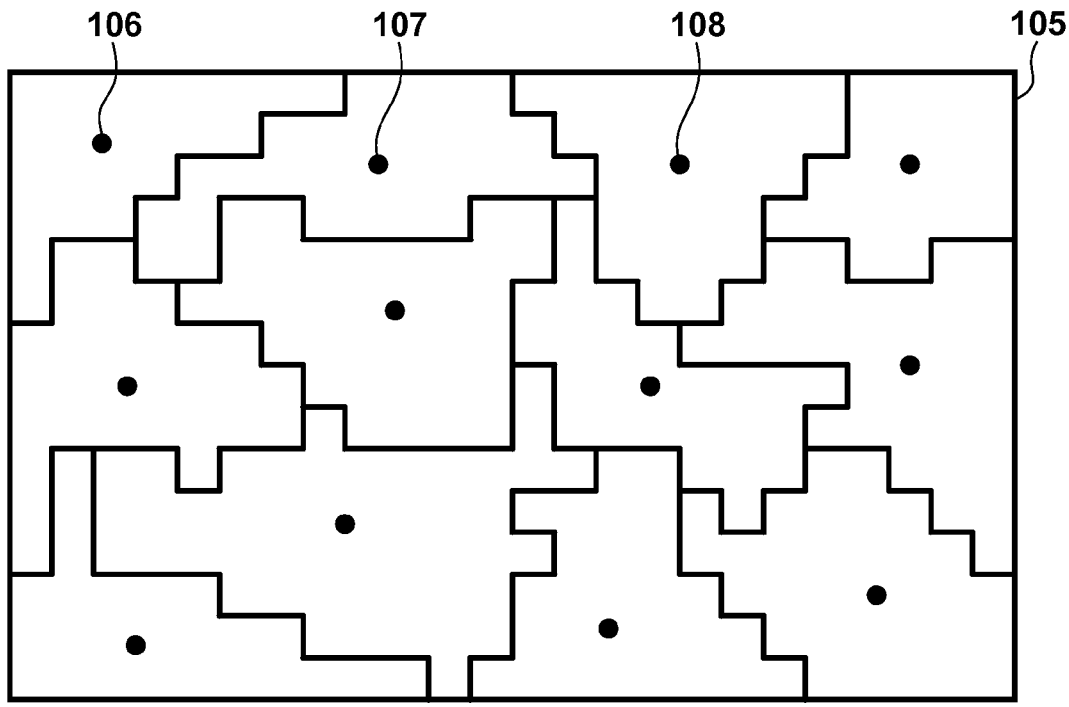

As described above, in this embodiment, not a label map describing the label of each pixel as shown in FIG. 1A but seed data including the vectors of seeds (FIG. 1B) fewer than the pixels and the information of divided regions to which the seeds belong is transmitted from the network camera 201 to the server apparatus 207. Using the seed data, the server apparatus 207 can execute region division processing for an image transmitted from the network camera 201. That is, according to this embodiment, region division processing can be implemented using a data amount smaller than that of a label map as shown in FIG. 1A. Hence, the transmission band of the transmission path 206 can also be reduced.

Note that in this embodiment, the image handled by the Superpixel generation unit 204 is the image (captured image) before encoding (before compression), and this captured image is encoded and transmitted to the server apparatus 207. When lossy encoding is applied to the encoding, the decompressed image decompressed on the side of the server apparatus 207 and the image handled by the Superpixel generation unit 204 do not necessarily match, and the labels obtained by the label generation unit 210 of the server apparatus 207 do not strictly match the region division result of the Superpixel generation unit 204. However, if the image quality is not extremely degraded by the compression, the label generation unit 210 can obtain a region division result that is of practicable level.

Alternatively, the encoding unit 203 may generate a local decompressed image by decompressing an encoded image, and the Superpixel generation unit 204 may generate seed data using the local decompressed image. This makes it possible to make the region division result of the Superpixel generation unit 204 match the region division result of the label generation unit 210 even when the encoding unit 203 performs lossy encoding.

To allow the network camera 201 and the server apparatus 207 to perform image division by the same method, parameters (K, S, m, and the like) used for image division on the side of the network camera 201 may be added to the encoded image and seed data and transmitted to the server apparatus 207. Using the parameters, the distance calculation unit 211 can perform image division using the same method as image division performed by the Superpixel generation unit 204.

When a formula different from that in non-patent literature 2 is used to calculate the distance measure D, parameters unique to the formula may be transmitted from the network camera 201 to the server apparatus 207 and used on the side of the server apparatus 207.

In this embodiment, a description has been made assuming that the region processing unit 215 performs category recognition for each region of the same label. However, the processing for the region is not limited to this, and another processing such as object detection, scene discrimination, or region-specific image processing using region information may be performed.

Second Embodiment

Figure 7:
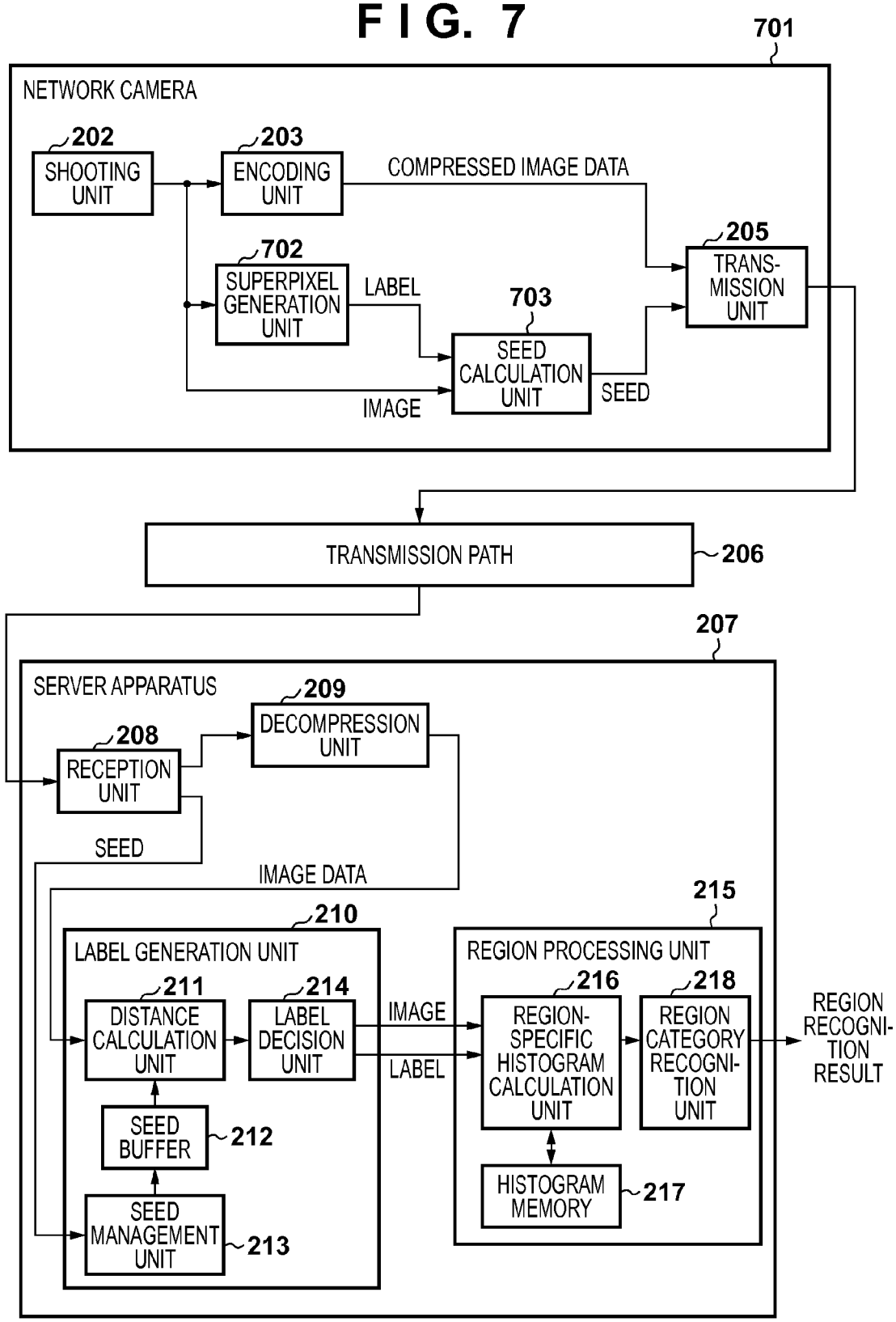
FIG. 7 is a block diagram showing an example of the arrangement of a system.

An example of the arrangement of a system according to this embodiment will be described with reference to the block diagram of FIG. 7. Note that the same reference numerals as those of the functional units shown in FIG. 2 denote the same functional units in FIG. 7, and a description thereof will be omitted.

In the first embodiment, the same region division algorithm is employed on the side of the network camera 201 (Superpixel generation unit 204) and on the side of the server apparatus 207 (label generation unit 210). In this embodiment, different region division algorithms are employed on the side of a network camera 701 and on the side of a server apparatus 207, unlike the first embodiment.

Figure 8A:
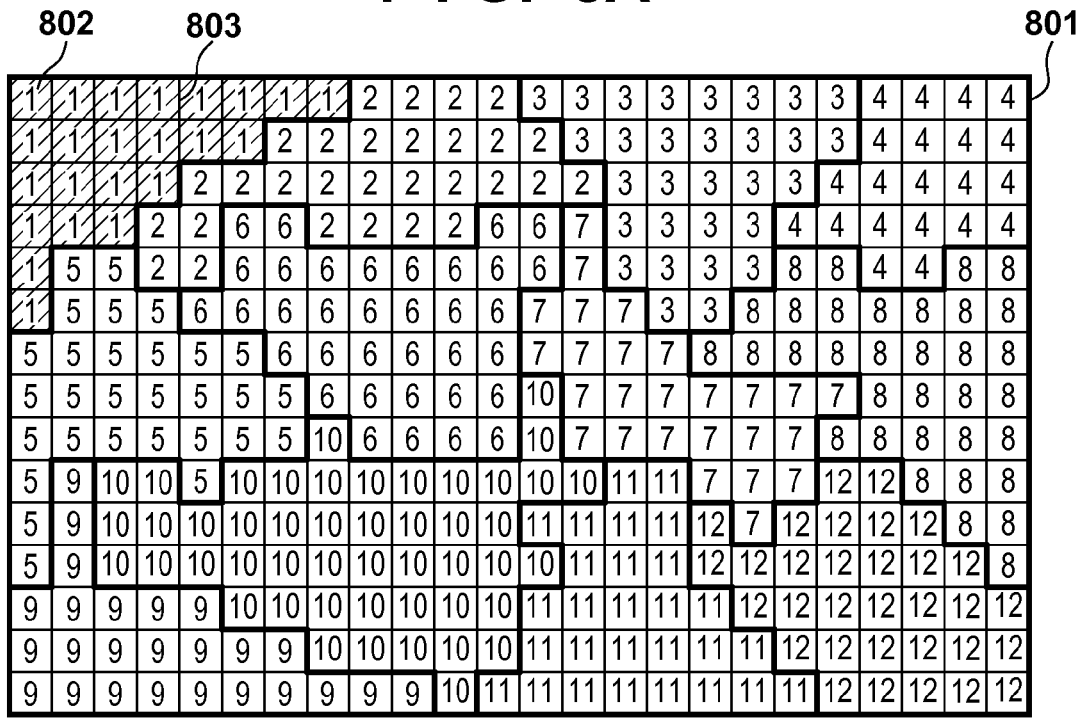
FIGS. 8A and 8B are views showing a label map.

In the network camera 701, a Superpixel generation unit 702 performs region division for a shot image sent from a shooting unit 202 using, for example, mean shift, region growing, split-and-merge, or a graph-based method, and assigns different labels to the divided regions, thereby generating a label map as shown in FIG. 8A.

A seed calculation unit 703 generates a vector Cj of a region of each label using the label map generated by the Superpixel generation unit 702 and the captured image obtained by the shooting unit 202.

Figure 9:
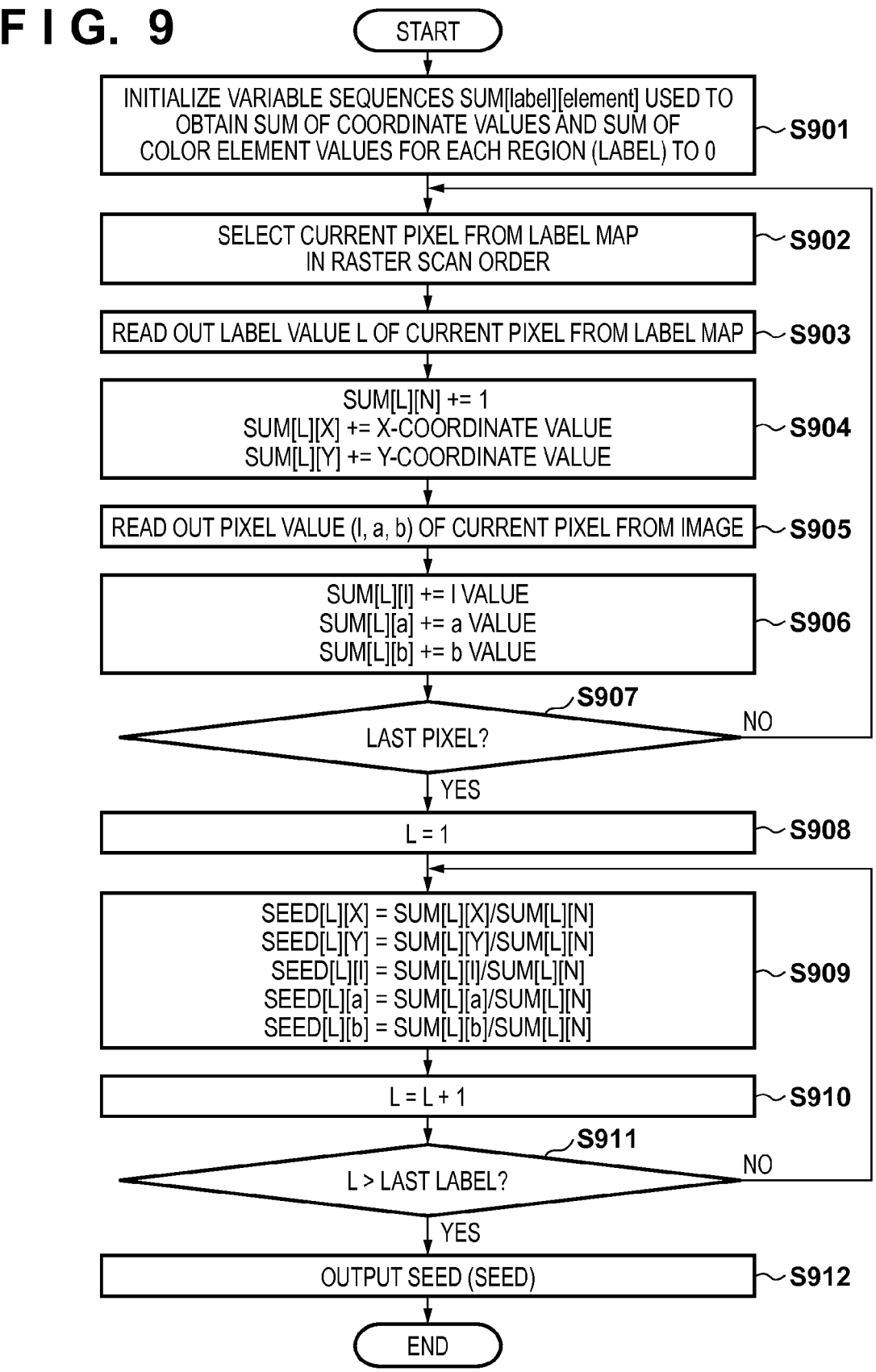
FIG. 9 is a flowchart of processing performed by a seed calculation unit 703.

Processing performed by the seed calculation unit 703 will be described with reference to FIG. 9 showing the flowchart of the processing.

<Step S901>

First, all variable arrays SUM[label][element] used to obtain the sum of coordinate positions and the sum of color elements for each label in the following processing are initialized to 0.

[label] represents a label used by the Superpixel generation unit 702, and label=1 to 12 in FIG. 8A. On the other hand, [element] is N representing the number of pixels, X representing an x-coordinate value, Y representing a y-coordinate value, l representing an L value, a representing an a value, or b representing a b value. In this step, a variable i to be used in the following processing is initialized to 1.

<Step S902>

The ith pixel is selected from the captured image as a selected pixel (pixel i). The order of selecting the pixels from the captured image is not limited to a specific selection order. For example, the pixels may be selected in the raster scan order.

<Step S903>

A label value L of the pixel i is read out from the label map.

<Step S904>

The value of SUM[L][N] is incremented by one, and the number of pixels of the label L is counted. The result of adding the x-coordinate value of the pixel i to the value (x-coordinate value) stored in SUM[L][X] is stored in SUM[L][X] again, thereby storing the x-coordinate value of the pixel of the label L. The result of adding the y-coordinate value of the pixel i to the value (y-coordinate value) stored in SUM[L][Y] is stored in SUM[L][Y] again, thereby storing the y-coordinate value of the pixel of the label L.

<Step S905>

The L value, a value, and b value of the pixel i are read out from the captured image. Note that if the color space of the captured image is not the Lab color space, the pixel value of the pixel i read out from the captured image is converted into the L value, a value, and b value.

<Step S906>

The result of adding the L value of the pixel i to the value (L value) stored in SUM[L][l] is stored in SUM[L][l] again, thereby storing the L value of the pixel of the label L. The result of adding the a value of the pixel i to the value (a value) stored in SUM[L][a] is stored in SUM[L][a] again, thereby storing the a value of the pixel of the label L. The result of adding the b value of the pixel i to the value (b value) stored in SUM[L][b] is stored in SUM[L][b] again, thereby storing the b value of the pixel of the label L.

<Step S907>

It is determined whether all pixels of the captured image are selected as the selected pixel. That is, it is determined whether the value of the variable i reaches M. Upon determining that all pixels are selected, the process advances to step S908. If an unselected pixel remains, the value of the variable i is incremented by one, and the process returns to step S902.

<Step S908>

The value of the variable L is initialized to 1.

<Step S909>

The value of SUM[L][X]/SUM[L][N], that is, the average x-coordinate value of the pixels having the label L is stored in a variable array SEED[L][X]. The value of SUM[L][Y]/SUM[L][N], that is, the average y-coordinate value of the pixels having the label L is stored in a variable array SEED[L][Y]. The value of SUM[L][l]/SUM[L][N], that is, the average L value of the pixels having the label L is stored in a variable array SEED[L][l]. The value of SUM[L][a]/SUM[L][N], that is, the average a value of the pixels having the label L is stored in a variable array SEED[L][a]. The value of SUM[L][b]/SUM[L][N], that is, the average b value of the pixels having the label L is stored in a variable array SEED[L][b].

<Step S910>

The value of the variable L is incremented by one.

<Step S911>

It is determined whether the value of the variable L exceeds the maximum label value (the maximum label value is 12 in FIG. 8A) used in the label map. Upon determining that the value of the variable L exceeds the maximum label value, the process advances to step S912. If the value of the variable L does not exceed the maximum label value, the process returns to step S909.

<Step S912>

Figure 8B:
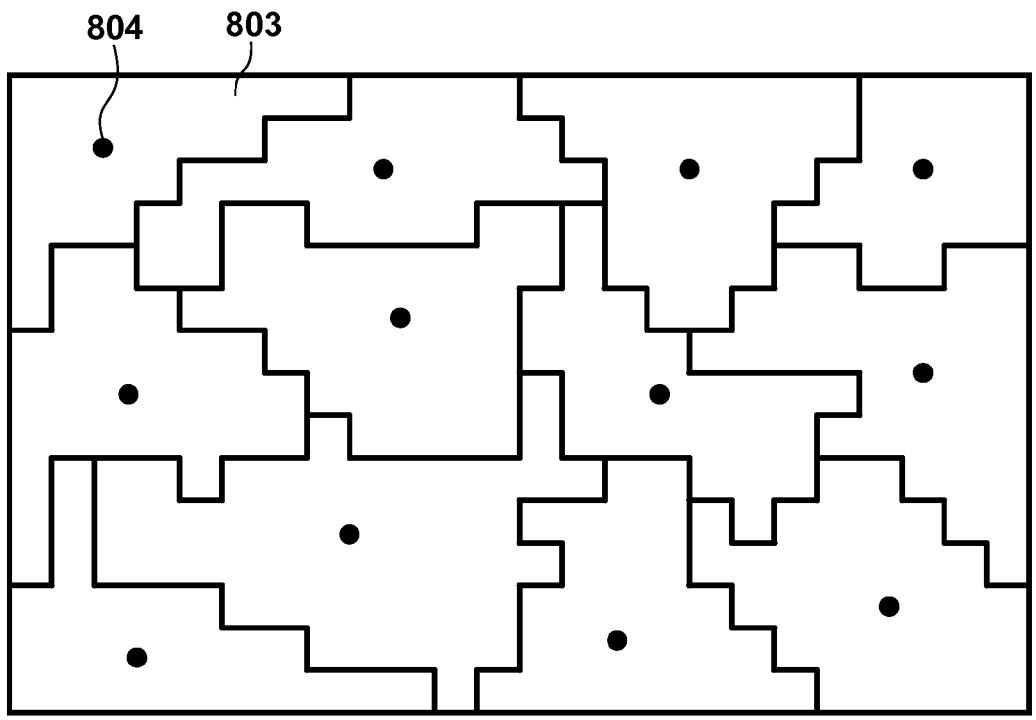

When the process advances to step S912, the average pixel position (x-coordinate value and y-coordinate value) and the average color (L value, a value, and b value) of the pixels having a label are obtained for each label. FIG. 8B shows the region division result and seeds (centers of gravity of divided regions).

With the above-described processing, a vector having SEED[L][X], SEED[L][Y], SEED[L][l], SEED[L][a], and SEED[L][b] as elements can be defined for each label L. Hence, the same processing as in the first embodiment is performed subsequently.

Note that each seed calculated according to the flowchart of FIG. 9 does not have a correspondence relationship to a rectangular region as indicated by the broken lines in FIG. 3C. However, when the seeds are arranged in accordance with the average coordinate positions and appropriately associated with the divided regions, a label generation unit 210 can perform region division by the same method as gSLIC, as in the first embodiment. Alternatively, without associating the seeds with the divided regions, the label generation unit 210 may obtain a seed at a position near the current pixel and perform distance comparison and region division, like SLIC described in non-patent literature 1 or 2.

Note that in this embodiment, a description has been made using the CIELAB color space as the color space used by the label generation unit 210. However, another color space such as an RGB color space or a YCC color space may be used.

Third Embodiment

Figure 10:
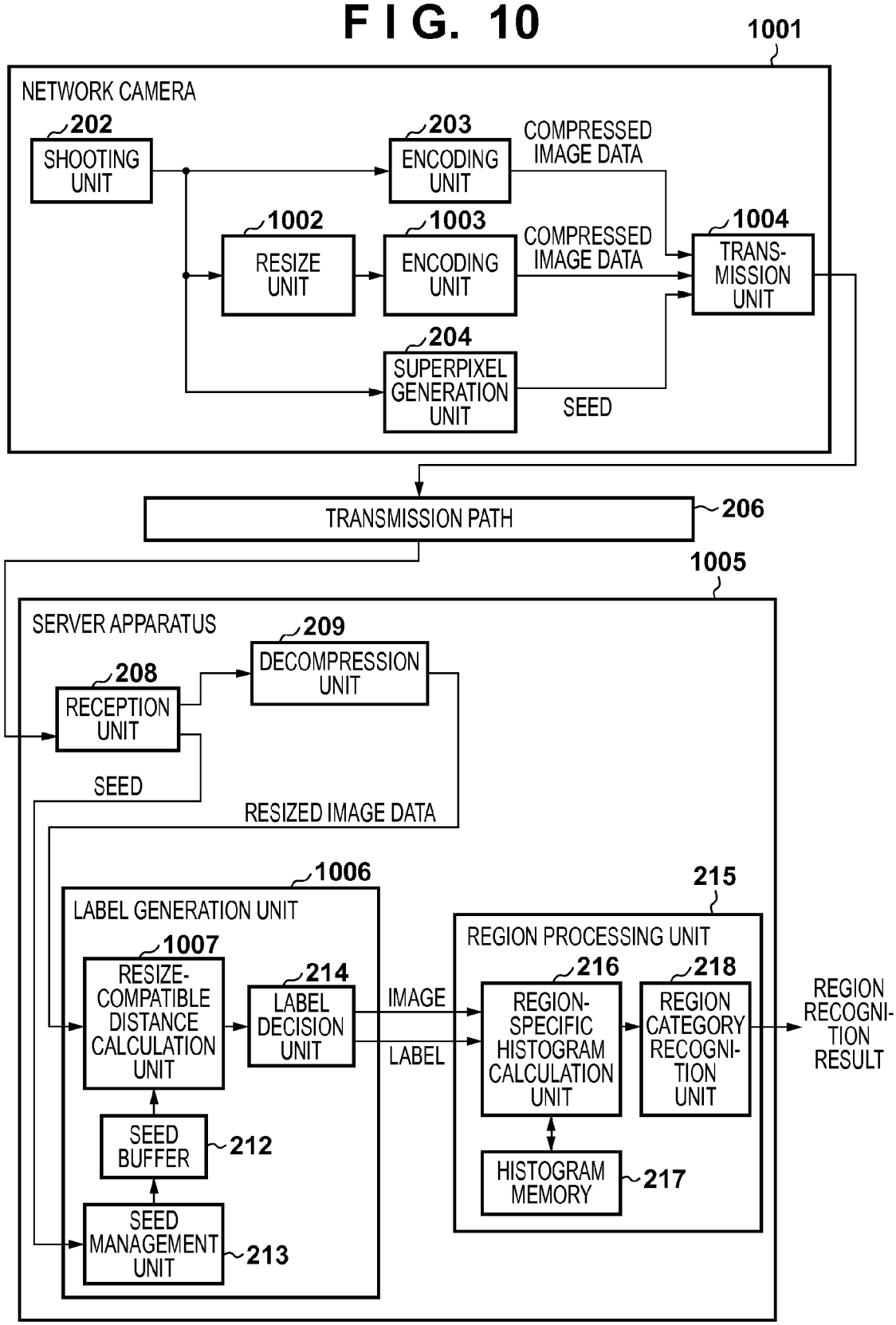
FIG. 10 is a block diagram showing an example of the arrangement of a system.

An example of the arrangement of a system according to this embodiment will be described with reference to the block diagram of FIG. 10. Note that the same reference numerals as those of the functional units described in the above embodiments denote the same functional units in FIG. 10, and a description thereof will be omitted.

In the first embodiment, the size of the image handled by the Superpixel generation unit 204 on the side of the network camera 201 equals the size of the image transmitted by the transmission unit 205. In this embodiment, the images have different sizes, unlike the first embodiment.

A resize unit 1002 performs enlargement processing or reduction processing for a captured image obtained by a shooting unit 202 and generates a resized captured image. An encoding unit 1003 performs encoding processing for the captured image resized by the resize unit 1002 and generates an encoded image.

A transmission unit 1004 transmits an encoded image generated by an encoding unit 203 and/or the encoded image generated by the encoding unit 1003 to a server apparatus 1005 via a transmission path 206 in addition to seed data obtained by a Superpixel generation unit 204.

The server apparatus 1005 is different from the server apparatus 207 of the first embodiment in that upon receiving a resized captured image from a network camera 1001, a label generation unit 1006 performs label generation corresponding to the resize.

A Euclidean distance d's on a resized coordinate space between a selected pixel (pixel i) selected from an image resized by a resize ratio r (decompressed image obtained by a decompression unit 209) and a selected seed selected for seeds corresponding to a rectangular region to which the pixel i belongs and eight rectangular regions adjacent to the rectangular region out of rectangular regions obtained by diving the image in the same way as in the first embodiment is given by $$d'_s = \sqrt{(x'_i - r x_j)^2 + (y'_i - r y_j)^2} \quad (7)$$

At this time, a distance measure D capable of obtaining a value equivalent to the distance measure for the image before resize is given by $$D = \sqrt{d_c^2 + \left(\frac{d'_s}{r \cdot S}\right)^2 m^2} \quad (8)$$

A resize-compatible distance calculation unit 1007 can perform the same region division as that for the image before resize for the resized image by calculating equations (3), (6), (7), and (8) described above (in equations (3), (6), (7), and (8), the vector of the selected seed is represented by Cj).

As described above, according to this embodiment, even in a case where a resized image is sent from the network camera 1001, when seed data corresponding to the original image size is sent, the label generation unit 1006 can obtain a region division result from the resized image and the seed data. Hence, even in this embodiment, the transmission band of the transmission path 206 can be reduced, as in the first embodiment.

Note that in this embodiment, an example in which one type of resized image is generated from the original image has been described. However, resized images of different resize ratios may be generated and transmitted to the server apparatus 1005. In this case as well, the label generation unit 1006 can obtain the same region division result as that for the image before resize if the resize ratio and seed data corresponding to the original image size are available. Note that the resize ratio can newly be input on the side of the server apparatus 1005 or transmitted from the network camera 1001 to the server apparatus 1005.

Fourth Embodiment

An example of the arrangement of a camera 1101 according to this embodiment will be described with reference to the block diagram of FIG. 11. The camera has a region division function of performing region division of image data and outputting region representative points of region division, a data holding function of holding a region representative point, an image data holding function of holding image data corresponding to the region representative point, a label generation function of reading out the image data held by the image data holding function and the region representative point held by the data holding function and generating a region label, and a region processing function of performing processing using the region label. The region processing function performs processing using the region label generated by the label generation function.

A sensor unit 1102 is, for example, a CMOS sensor that converts outside light into an image signal and outputs it. A development unit 1103 converts the image signal into a captured image as digital data and stores the converted captured image in a memory unit 1114 as image data 1115.

The memory unit 1114 provides an area to store various data and is capable of appropriately performing data read/write.

A Superpixel generation unit 1104 performs the same operation as the Superpixel generation unit 204 according to the first embodiment. The Superpixel generation unit 1104 reads out the captured image stored in the memory unit 1114 as the image data 1115, generates seed data 1116 of each region from the captured image, and stores the generated seed data 1116 in the memory unit 1114. That is, the Superpixel generation unit 1104 performs processing according to the flowchart of FIG. 4.

A label generation unit 1105 performs the same operation as the label generation unit 210 according to the first embodiment. The label generation unit 1105 reads out the image data 1115 and the seed data 1116 from the memory unit 1114, performs labeling processing, and sends the image data 1115 and the result of labeling processing to a region processing unit 1110. That is, the label generation unit 1105 performs processing according to the flowchart of FIG. 6.

The region processing unit 1110 recognizes the category (for example, person, mountain, or the like) of the region of each label in the captured image represented by the image data 1115 using the image data 1115 and the labeling processing result, and stores the result in the memory unit 1114 as a region category recognition result 1117.

The label generation unit 1105 will be described next in more detail.

A seed management unit 1108 stores, in a seed buffer 1107, the seed data of each region read out from the memory unit 1114.

For each pixel (each pixel in the image data) of the captured image represented by the image data 1115 read out from the memory unit 1114, a distance calculation unit 1106 calculates the distance to a seed corresponding to the seed data stored in the seed buffer 1107.

A label decision unit 1109 specifies a seed corresponding to a pixel for each pixel of the captured image based on the calculation result of the distance calculation unit 1106, and outputs a label corresponding to the seed in association with the pixel.

The region processing unit 1110 will be described next in more detail.

Using the captured image and the label sent from the label decision unit 1109, a region-specific histogram calculation unit 1111 creates, for each label, the histogram (histogram of pixel values) of a pixel group corresponding to the label using a histogram memory 1112. Every time a histogram is created, the region-specific histogram calculation unit 1111 sends the histogram to a region category recognition unit 1113 of the subsequent stage.

The region category recognition unit 1113 discriminates the category of each region using the histogram of the region sent from the region-specific histogram calculation unit 1111. As a method of category discrimination, various methods such as a rule-based method, a method using a neural network, and a method using a discriminator such as SVM are applicable.

As described above, according to this embodiment, the labels generated by the label generation unit 1105 are not stored in the memory unit 1114 as a label map but used by the region processing unit 1110. It is therefore possible to reduce the memory utilization and also reduce the access band to the memory unit 1114 as compared to a case where a label map (or compressed label map) is stored in the memory unit 1114.

Note that parameters (K, S, m, and the like) used by the Superpixel generation unit 1104 for region division may be held in the memory unit 1114 as parameters, and the label generation unit 1105 may read out the parameters from the memory unit 1114 and use them. When a formula different from that in non-patent literature 2 is used to calculate the distance measure D, parameters unique to the formula may be stored in the memory unit and used for label generation processing.

In this embodiment, category recognition on a region basis is performed as the processing of the region processing unit 1110. However, the contents of region processing are not limited to this, and another processing such as object detection, scene discrimination, or region-specific image processing using region information may be performed. FIG. 11 illustrates only one region processing unit 1110. However, a plurality of region processing units 1110 may be provided, or one region processing unit 1110 may be operated a plurality of times.

Figure 11:
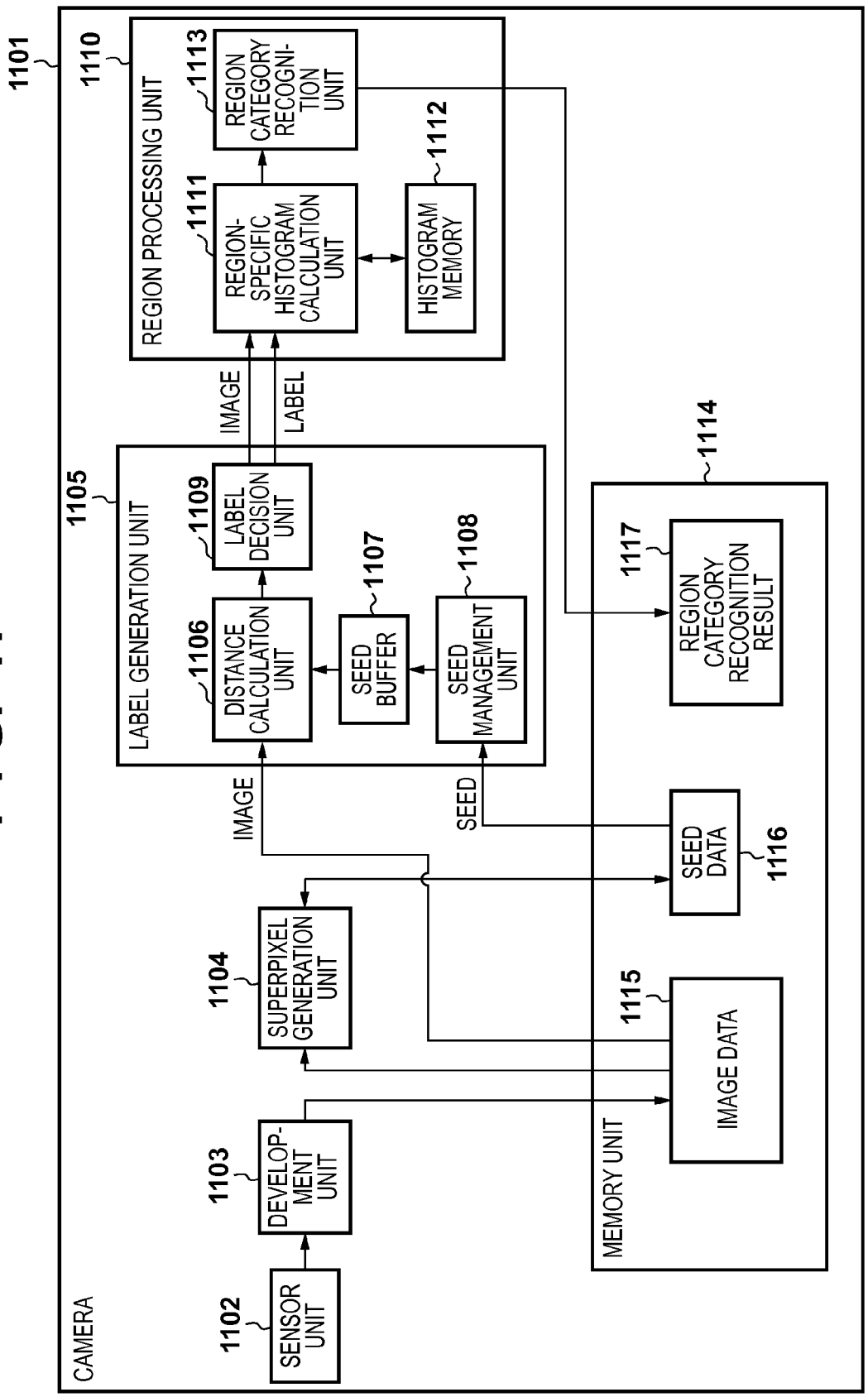
FIG. 11 is a block diagram showing an example of the arrangement of a camera 1101.

Additionally, FIG. 11 separately illustrates the Superpixel generation unit 1104 and the label generation unit 1105. However, these units include common processes, as is apparent from comparison of the flowcharts of FIGS. 4 and 6. Hence, the processes common to the Superpixel generation unit 1104 and the label generation unit 1105 may be executed by a newly provided functional unit. In this case, the Superpixel generation unit 1104 and the label generation unit 1105 execute processes other than the common processes using the result of the functional unit. Alternatively, one processing unit capable of performing processes of both the Superpixel generation unit 1104 and the label generation unit 1105 may be provided.

Fifth Embodiment

Figure 12:
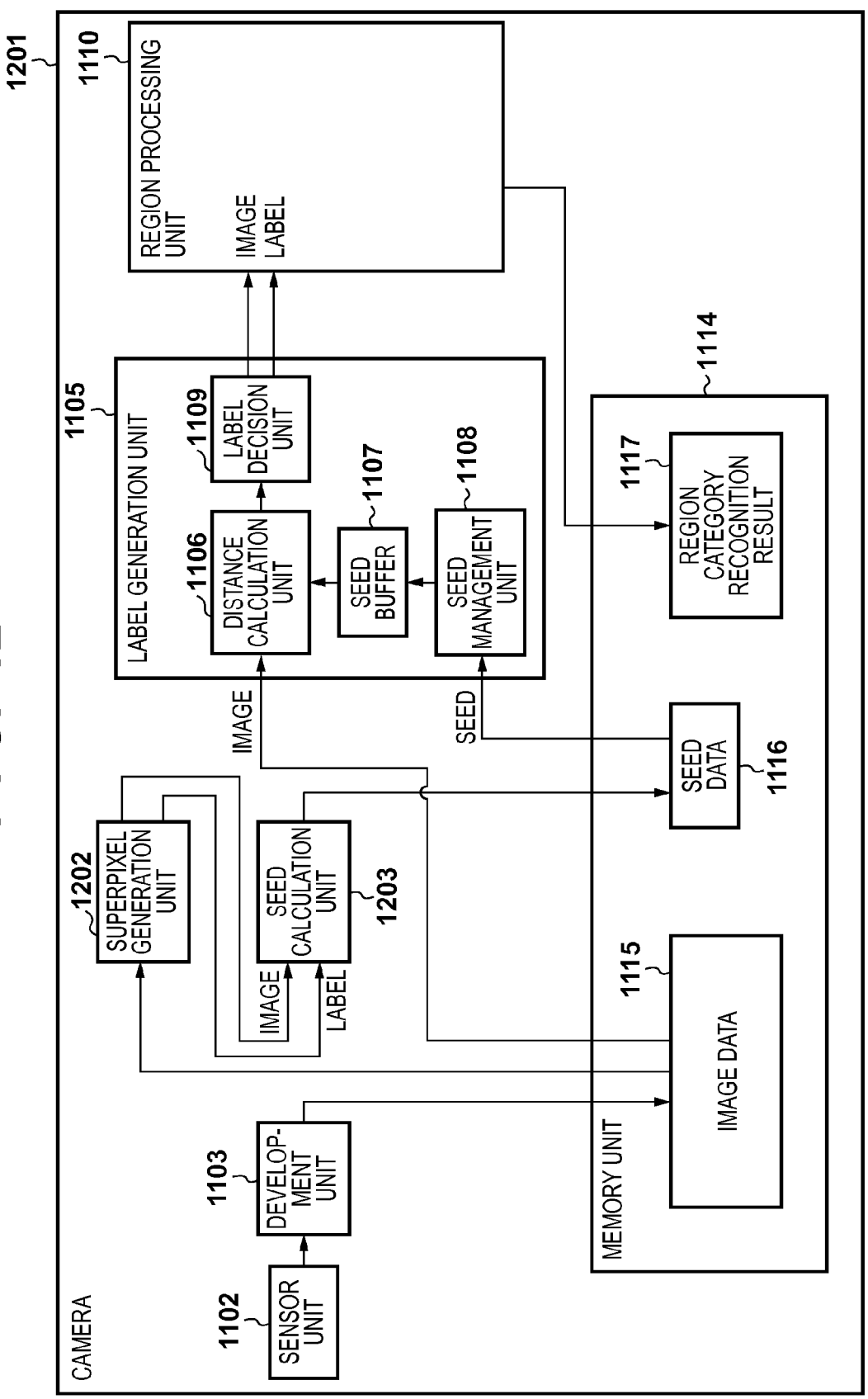
FIG. 12 is a block diagram showing an example of the arrangement of a camera 1201.

An example of the arrangement of a camera 1201 according to this embodiment will be described with reference to the block diagram of FIG. 12. The same reference numerals as those of the functional units described in the above embodiments denote the same functional units in FIG. 12, and a description thereof will be omitted. In the fourth embodiment, the Superpixel generation unit 1104 and the label generation unit 1105 use the same region division algorithm. In this embodiment, however, they use different algorithms.

A Superpixel generation unit 1202 performs region division processing for image data 1115 using a region division algorithm different from that of a label generation unit 1105. Region division of the image is performed using, for example, mean shift, region growing, split-and-merge, or a graph-based method.

A seed calculation unit 1203 performs the same operation as the seed calculation unit 703 according to the second embodiment. The seed calculation unit 1203 generates a vector Cj of a region of each label using a label map generated by the Superpixel generation unit 1202 and a captured image represented by the image data 1115. That is, the seed calculation unit 1203 performs processing according to the flowchart of FIG. 9.

Note that each seed calculated according to the flowchart of FIG. 9 does not have a correspondence relationship to a rectangular region as indicated by the broken lines in FIG. 3C. However, when the seeds are arranged in accordance with average coordinate positions and appropriately associated with the rectangular regions, the label generation unit 1105 can perform region division by the same method as gSLIC, as in the first embodiment. Alternatively, without associating the seeds with the rectangular regions, the label generation unit 1105 may obtain a seed at a position near the current pixel and perform distance comparison and region division, like SLIC described in non-patent literature 1 or 2.

From then on, the same processing as in the fourth embodiment is performed. The label generation unit 1105 decides a label using seed data obtained by the seed calculation unit 1203, and a region processing unit 1110 performs region category recognition using the label.

As described above, according to this embodiment, the labels generated by the label generation unit 1105 are not stored in a memory unit 1114 as a label map but used by the region processing unit 1110. It is therefore possible to reduce the memory utilization and also reduce the access band to the memory unit 1114 as compared to a case where a label map (or compressed label map) is stored in the memory unit 1114.

Sixth Embodiment

Figure 13:
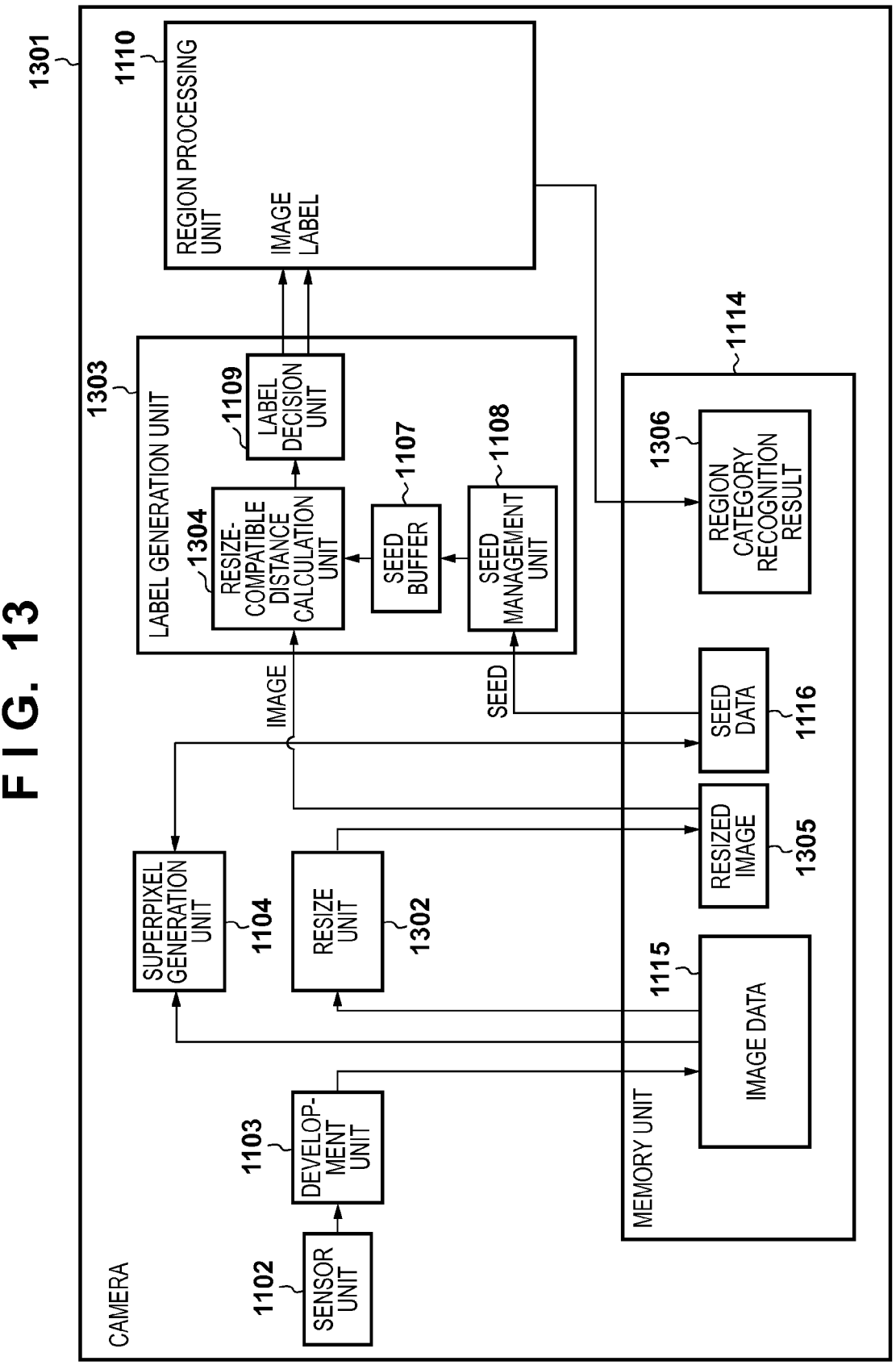
FIG. 13 is a block diagram showing an example of the arrangement of a camera 1301.

An example of the arrangement of a camera 1301 according to this embodiment will be described with reference to the block diagram of FIG. 13. The same reference numerals as those of the functional units described in the above embodiments denote the same functional units in FIG. 13, and a description thereof will be omitted.

In the fourth embodiment, the size of the image handled by the Superpixel generation unit 1104 equals the size of the image handled by the label generation unit 1105. In this embodiment, the images have different sizes, unlike the fourth embodiment.

A resize unit 1302 reads out image data 1115 stored in a memory unit 1114 by a development unit 1103, performs enlargement processing or reduction processing for a captured image represented by the readout image data 1115, and generates a resized captured image as a resized image 1305. The resize unit 1302 stores the resized image 1305 in the memory unit 1114.

A resize-compatible distance calculation unit 1304 reads out the resized image 1305 from the memory unit 1114 and performs the same operation as the resize-compatible distance calculation unit 1007 using the readout resized image 1305.

As described above, according to this embodiment, even in a case where a resized image is processed in the camera, when seed data corresponding to the original image size is held, a label generation unit 1303 can obtain a region division result for the resized image. It is therefore possible to reduce the memory utilization and also reduce the access band to the memory unit 1114.

Note that in this embodiment, an example in which one type of resized image is generated from the original image has been described. However, resized images of different resize ratios may be generated. In this case as well, the label generation unit 1303 can obtain the same region division result as that for the image before resize if the resize ratio and seed data corresponding to the original image size are available. Note that the resize ratio can newly be input or stored in the memory unit 1114 and appropriately read out and used by the label generation unit 1303 as needed.

Seventh Embodiment

Figure 14:
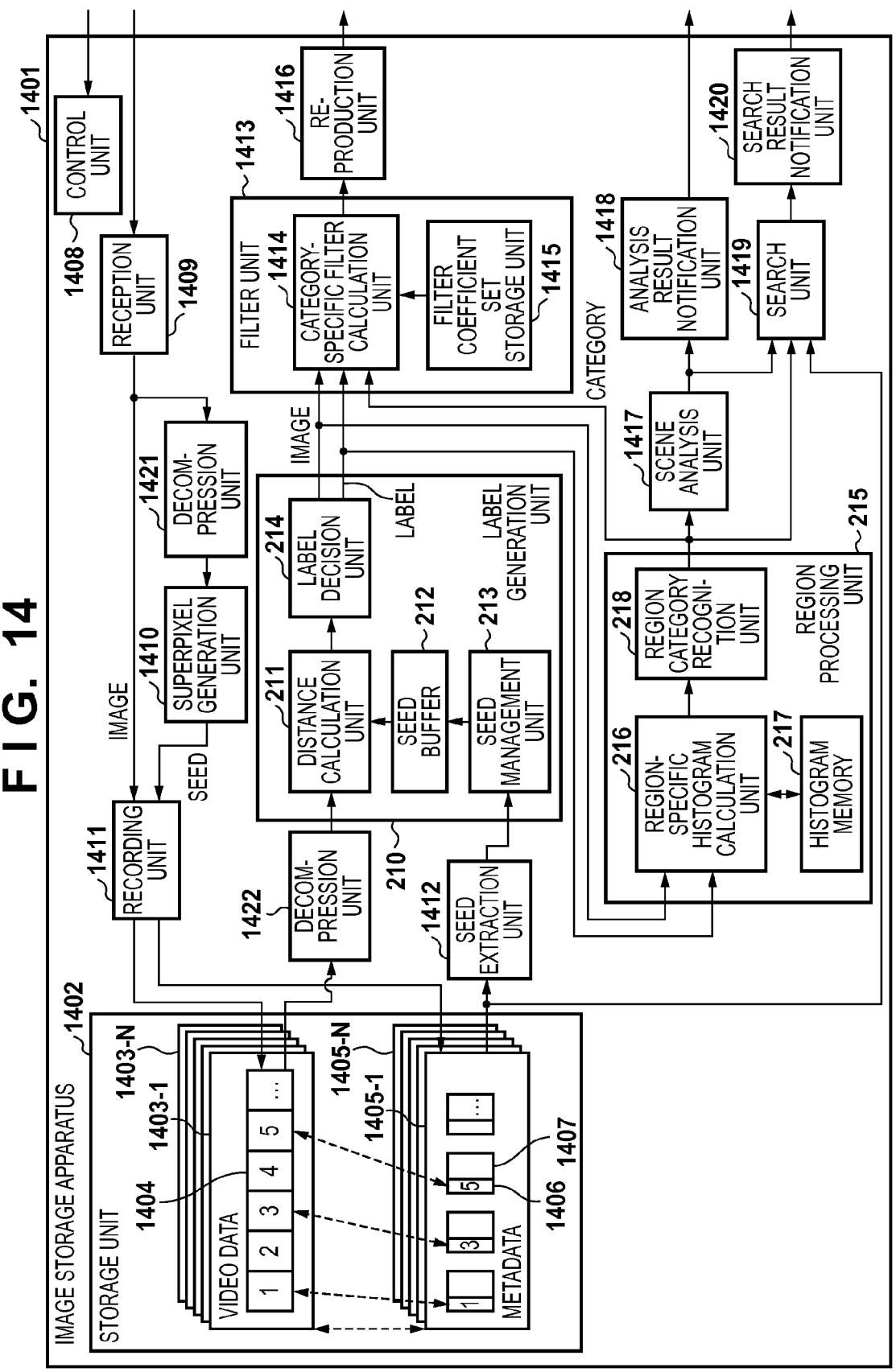
FIG. 14 is a block diagram showing an example of the arrangement of an image storage apparatus 1401.

An example of the arrangement of an image storage apparatus 1401 according to this embodiment will be described with reference to the block diagram of FIG. 14. The same reference numerals as those of the functional units described in the above embodiments denote the same functional units in FIG. 14, and a description thereof will be omitted. The image storage apparatus 1401 is an apparatus having a function of storing metadata corresponding to video data and searching for, analyzing, and reproducing data in accordance with an instruction from the user.

A storage unit 1402 stores video data 1403-1 to 1403-N and metadata 1405-1 to 1405-N corresponding to the video data. These stored data are appropriately read out in accordance with a request from the user. Each video data stores data 1404 corresponding to one or more images (frames or fields) in a compressed or non-compressed format. In each metadata, data associated with one image (frame or field) is formed from information 1406 such as a time stamp or frame number used for association with an image and metadata information 1407 about the associated image. In the example of FIG. 14, first metadata included in the metadata 1405-1 includes metadata information corresponding to frame number 1, next metadata includes metadata information corresponding to frame number 3, and metadata next to the metadata includes metadata information corresponding to frame number 5. In this embodiment, seed data generated by a Superpixel generation unit 1410 is stored in the corresponding metadata information 1407. Note that the metadata information can be stored in all images (frames or fields) or only some images of video data.

A control unit 1408 controls the operation of the entire image storage apparatus 1401 and, for example, executes or controls processing according to a setting instruction or execution instruction from the user.

As for video data storage in the storage unit 1402, a reception unit 1409 receives video data from the outside, and a recording unit 1411 stores the data of each image of the video data in the storage unit 1402. The reception unit 1409 sends the data of each image of the video data to a decompression unit 1421 as well. The decompression unit 1421 decompresses each received image and generates a decompressed image. The Superpixel generation unit 1410 generates seed data of each region from the decompressed image decompressed by the decompression unit 1421. The recording unit 1411 stores the seed data of each region in the storage unit 1402 as metadata.

Note that in this embodiment, an example has been described in which only video data is received from the outside, and the Superpixel generation unit 1410 generates seed data and stores it in the storage unit 1402. However, if seed data is already calculated outside, it may directly be stored.

To reproduce video data, a reproduction unit 1416 can directly read out video data from the storage unit 1402 and reproduce it. However, a case where video data is reproduced after image quality is improved by applying a filter according to a category to each region of the video data will be described.

To decide the category of each region of video data, a seed extraction unit 1412 reads out seed data from the storage unit 1402 and supplies it to a label generation unit 210 and a region processing unit 215. The category of each region is recognized by the label generation unit 210 and the region processing unit 215. When an instruction to designate video data to be reproduced is input from the outside, the control unit 1408 operates functional units to be described below. A decompression unit 1422 thus reads out the designated video data from the storage unit 1402, decompresses it, and sends the decompressed image of each frame to the label generation unit 210. The seed extraction unit 1412 reads out corresponding metadata from the storage unit 1402, extracts seed data from the readout metadata, and sends it to the label generation unit 210. The label generation unit 210 performs labeling processing for the decompressed image using the seed data, and sends the decompressed image and the result of the labeling processing to the region processing unit 215 of the subsequent stage. The region processing unit 215 recognizes the category (for example, person, mountain, or the like) of the region of each label in the decompressed image using the decompressed image and the labeling processing result sent from the label generation unit 210, and outputs the result.

A filter unit 1413 receives the label and the decompressed image from the label generation unit 210 and the category corresponding to the region (label) from the region processing unit 215, selects a filter coefficient suitable for each category, applies the filter to the image, and outputs it.

A category-specific filter calculation unit 1414 obtains a corresponding category from the label of pixels currently under processing, selects a corresponding filter coefficient from a plurality of filter coefficients stored in a filter coefficient set storage unit 1415, and executes filter processing using the selected filter coefficient.

The reproduction unit 1416 reproduces the image that has undergone the filter processing of the filter unit 1413.

To analyze video data, the decompression unit 1422, the seed extraction unit 1412, the label generation unit 210, and the region processing unit 215 operate to do category recognition on a region basis for video data of the analysis target in accordance with a setting or instruction from the user, as in the reproduction mode. A scene analysis unit 1417 analyzes the entire image or entire video using the category recognition result of each region and sends the analysis results to an analysis result notification unit 1418. The analysis result notification unit 1418 notifies the user of the analysis result.

To search for video data, category recognition on a region basis and scene analysis are performed for video data of the search target in accordance with a setting or instruction from the user. At this time, the decompression unit 1422, the seed extraction unit 1412, the label generation unit 210, the region processing unit 215, and the scene analysis unit 1417 operate as in the reproduction mode. A search unit 1419 performs a search in accordance with a search condition based on the original metadata, region category recognition result, and scene analysis result stored in the storage unit 1402, and sends the result to a search result notification unit 1420. The search result notification unit 1420 notifies the user of the search result.

As described above, according to this embodiment, reproduction/analysis/search using the region division result can be performed without storing a label map as metadata. It is therefore possible to reduce the capacity to store metadata in the storage unit 1402.

Note that in this embodiment, an example in which seed data is stored and stored in metadata independently of video data has been described. However, seed data may be stored in video data. For example, seed data may be stored as part of header information of each image (frame or field) of video data.

Parameters (K, S, m, and the like) used by the Superpixel generation unit 1410 for region division may be stored as part of metadata, and read out and used when executing the label generation unit 210. When a formula different from that in non-patent literature 2 is used to calculate a distance measure D, parameters unique to the formula may be stored and used for label generation processing.

In this embodiment, category recognition on a region basis is performed as the processing of the region processing unit 215. However, the contents of region processing are not limited to this, and another processing such as object detection, scene discrimination, or region-specific image processing using region information may be performed. In this embodiment, a case where video data is stored has been described as an example. However, an enormous amount of still image data may be stored in association with metadata.

Eighth Embodiment

Figure 15:
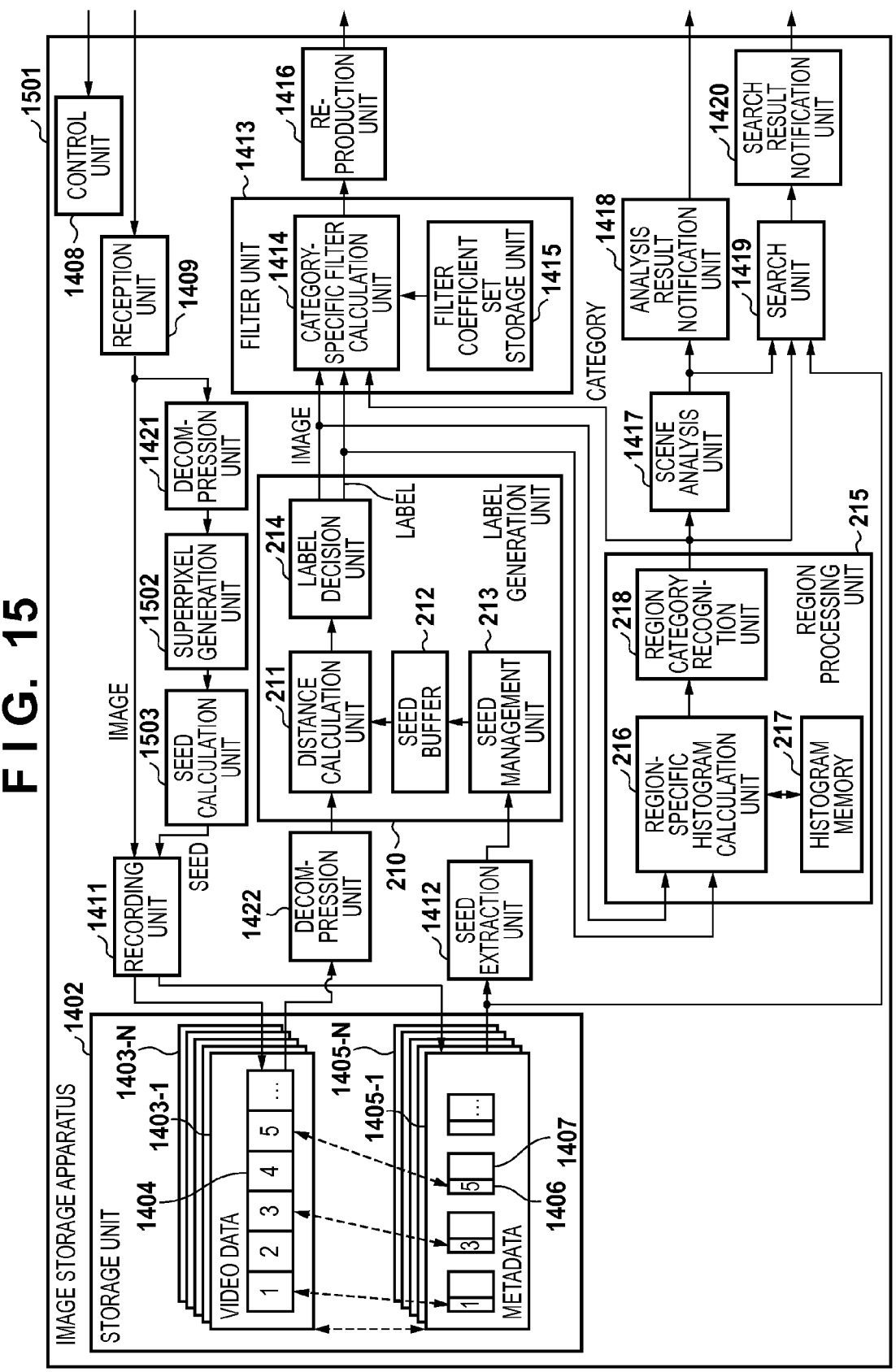
FIG. 15 is a block diagram showing an example of the arrangement of an image storage apparatus 1501.

An example of the arrangement of an image storage apparatus 1501 according to this embodiment will be described with reference to FIG. 15. Note that the same reference numerals as those of the functional units described in the above embodiments denote the same functional units in FIG. 15, and a description thereof will be omitted. In the seventh embodiment, the Superpixel generation unit 1410 and the label generation unit 210 use the same region division algorithm. In this embodiment, however, they use different algorithms.

In the image storage apparatus 1501, a Superpixel generation unit 1502 uses a region division algorithm different from that of a label generation unit 210. Region division of an image is performed using, for example, mean shift, region growing, split-and-merge, or a graph-based method. Next, a seed calculation unit 1503 calculates seed data from a label that is the region division processing result of the Superpixel generation unit 1502 and a decompressed image obtained by a decompression unit 1421. From then on, the same processing as in the seventh embodiment is performed. The label generation unit 210 decides a label using seed data obtained by the seed calculation unit 1503, and a region processing unit 215 performs region category recognition using the label. Note that the seed calculation unit 1503 performs the same operation as the seed calculation unit 703 according to the second embodiment, and executes processing according to the flowchart of FIG. 9.

Note that each seed calculated according to the flowchart of FIG. 9 does not have a correspondence relationship to a rectangular region as indicated by the broken lines in FIG. 3C. However, when the seeds are arranged in accordance with average coordinate positions and appropriately associated with the rectangular regions, the label generation unit 210 can perform region division by the same method as gSLIC, as in the first embodiment. Alternatively, without associating the seeds with the rectangular regions, the label generation unit 210 may obtain a seed at a position near the current pixel and perform distance comparison and region division, like SLIC described in non-patent literature 1 or 2.

As described above, according to this embodiment, even if the Superpixel generation unit 1502 and the label generation unit 210 use different region division algorithms, it is unnecessary to store a label map as metadata. It is therefore possible to reduce the capacity to store metadata in a storage unit 1402.

Note that in this embodiment, an example has been described in which only video data is received from the outside, and the Superpixel generation unit 1502 generates seed data and stores it in the storage unit 1402. However, if seed data is already calculated outside, it may be given to the seed calculation unit 1503.

Ninth Embodiment

Figure 16:
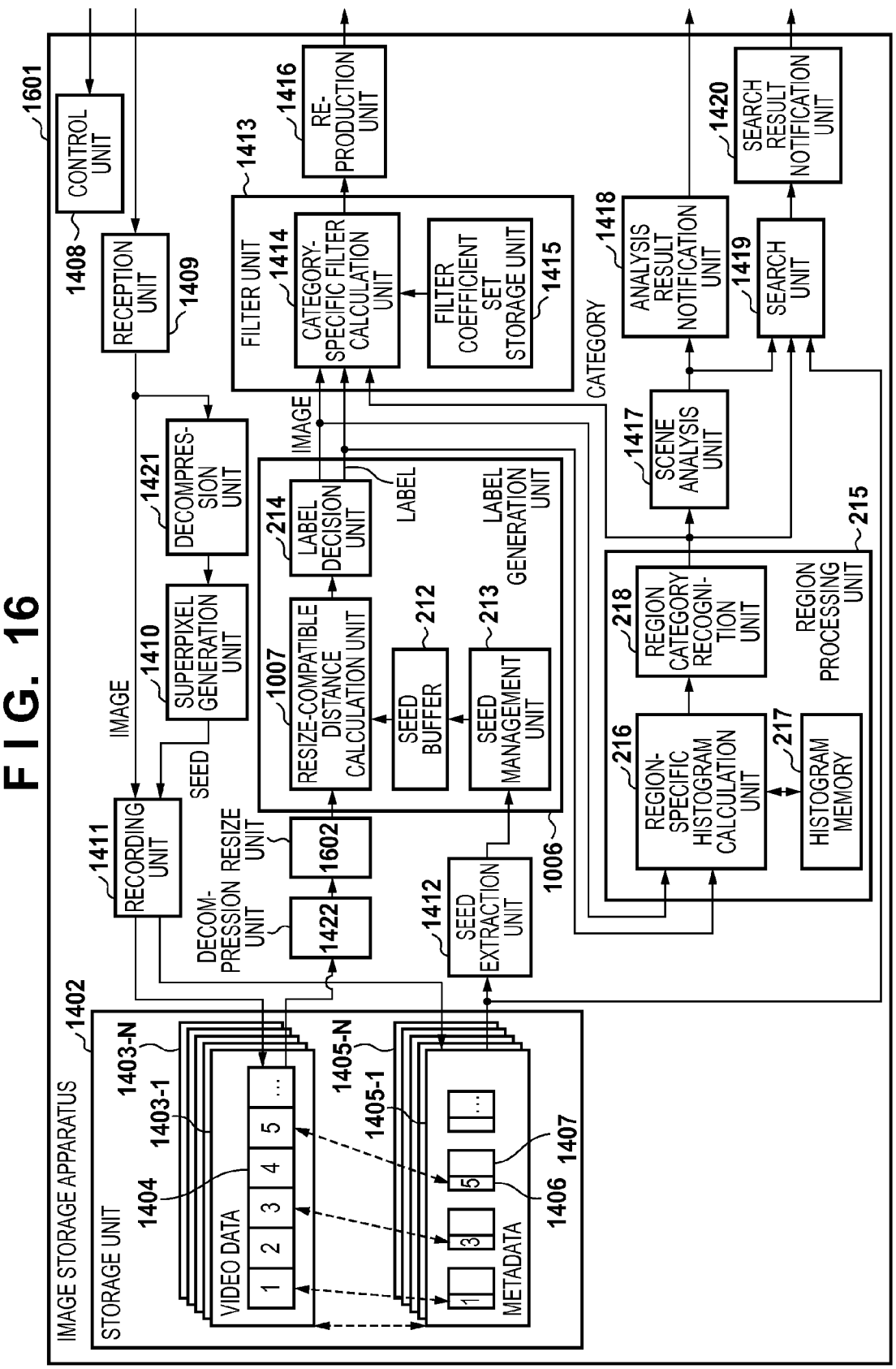
FIG. 16 is a block diagram showing an example of the arrangement of an image storage apparatus 1601

An example of the arrangement of an image storage apparatus 1601 according to this embodiment will be described with reference to the block diagram of FIG. 16. Note that the same reference numerals as those of the functional units described in the above embodiments denote the same functional units in FIG. 16, and a description thereof will be omitted.

In the seventh embodiment, the size of the image handled by the Superpixel generation unit 1410 equals the size of the image handled by the label generation unit 210. In this embodiment, the images have different sizes, unlike the seventh embodiment.

A resize unit 1602 of the image storage apparatus 1601 according to this embodiment performs enlargement processing or reduction processing for a decompressed image obtained by a decompression unit 1422 to generate a resized decompressed image, and supplies the generated resized decompressed image to a label generation unit 1006.

As described above, according to this embodiment, even if video data is used after resize, it is unnecessary to store a label map as metadata. It is therefore possible to reduce the capacity to store metadata in a storage unit 1402. In particular, even if resize may be performed using a plurality of resize ratios, only the seed data of the original image needs to be stored.

10th Embodiment

The storage unit 1402 according to the seventh to ninth embodiments can be a hard disk, memory, or the like fixed in the apparatus. In place of the storage unit 1402, a storage medium access unit capable of accessing a medium such as a detachable hard disk, optical disk, magnetooptical disk, memory card, or tape may be used. When the storage medium access unit is provided, the apparatus may be dedicated to reproduction/analysis/search without including a reception unit 1409, a Superpixel generation unit 1410/1502, a recording unit 1411, and a seed calculation unit 1503 used to record data.

11th Embodiment

All the functional units of the apparatuses shown in FIGS. 2, 7, and 10 to 16 can be formed from hardware. However, one or more functional units may be formed from software (computer program). In this case, any computer including a memory that holds the computer program and a processor that executes the computer program is applicable to the apparatus.

Conclusion

According to the above embodiments, since region labels are generated using an image and region representative points of divided regions, a region division result can be expressed by information on the order of a fraction of the number of pixels per region (for example, 1/100 if a region includes 10×10 pixels). As compared to a case where a label map itself is sent or a case where a label map is compressed by an existing technique, the system including the network camera and the server can reduce the transmission band for the region division result.

When performing region division in the camera and performing processing using the result, the size of the memory to store the region division result and the memory transfer band can be reduced. In addition, when storing the region division result together with the image in the apparatus for storing image data, the size of the storage area used to store metadata can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-116200, filed Jun. 4, 2014, which is hereby incorporated by reference herein in its entirety.

What is claimed is:

1. An image transmission system comprising:
a transmission device comprising:
one or more first processors, and
at least one first memory coupled to the one or more first processors, the at least one first memory having instructions stored thereon which, when executed by the one or more first processors, cause the transmission device to:
divide image data into a plurality of regions on the basis of a similarity of pixels, and
transmit the image data and region representative points of the plurality of regions; and
a reception device comprising:
one or more second processors, and
at least one second memory coupled to the one or more second processors, the at least one second memory having instructions stored thereon which, when executed by the one or more second processors, cause the reception device to:
receive the image data and the region representative points transmitted from the transmission device,
assign, for each pixel in the image data, one of the region representative points based on distances between respective region representative points and the pixel in a feature space,
update a location and a pixel value of the region representative point in the image data on the basis of locations and pixel values of pixels assigned to the region representative point, and
generate region labels used for identifying the plurality of regions, using the image data and the region representative points whose location and pixel value have been updated.

2. The system according to claim 1, wherein the at least one first memory has instructions stored thereon which, when executed by the one or more first processors, further cause the transmission device to transmit a parameter which has been used to divide the image data into the plurality of regions, and
wherein the at least one second memory has instructions stored thereon which, when executed by the one or more second processors, further cause the reception device to generate the region label using the image data, the region representative points, and the parameter.

3. The system according to claim 1, wherein the at least one first memory has instructions stored thereon which, when executed by the one or more first processors, further cause the transmission device to calculate the region representative point as a value of a representative of each of the plurality of regions in the feature space.

4. The system according to claim 1,
wherein the at least one first memory has instructions stored thereon which, when executed by the one or more first processors, further cause the transmission device to:
resize image data, and
transmit the resized image data and region representative points corresponding to the image data before resize, and
wherein the at least one second memory has further instructions stored thereon which, when executed by the one or more second processors, further cause the reception device to generate the region labels using the resized image data and the region representative points corresponding to the plurality of regions in the image data before resize.

5. The system according to claim 4, wherein the at least one second memory has instructions stored thereon which, when executed by the one or more second processors, further cause the reception device to calculate for each pixel in the resized image data, a distance in a feature space between the pixel and each of a plurality of region representative points as being candidates according to a resize ratio.

6. An image transmission system comprising:
a transmission device comprising:
one or more first processors; and
at least one first memory coupled to the one or more first processors, the at least one first memory having instructions stored thereon which, when executed by the one or more first processors, cause the transmission device to:
divide image data into a plurality of regions on the basis of a similarity of pixels,
transmit the image data and region representative points of the plurality of regions,
compress image data, and
transmit the compressed image data and region representative points calculated using the image data before compression; and
a reception device comprising:
one or more second processors; and
at least one second memory coupled to the one or more second processors, the at least one second memory having instructions stored thereon which, when executed by the one or more second processors, cause the reception device to:
receive the transmitted image data and the region representative points,
decompress the compressed image data, and
generate region labels used for identifying the plurality of regions, using the decompressed image data and the transmitted region representative points.

7. A control method of an image transmission system having a transmission device and a reception device, the control method comprising:
dividing, at the transmission device, image data into a plurality of regions on the basis of a similarity of pixels;
transmitting, from the transmission device, the image data and region representative points of the plurality of regions;
receiving, at the reception device, the image data and the region representative points transmitted from the transmission device;
assigning, for each pixel in the image data, one of the region representative points based on distances between respective region representative points and the pixel in a feature space;
updating a location and a pixel value of the region representative point in the image data on the basis of locations and pixel values of pixels assigned to the region representative point; and
generating, at the reception device, region labels used for identifying the plurality of regions using the image data and the region representative points whose location and pixel value have been updated.

* * * * *